(12) United States Patent
Alexander et al.

(10) Patent No.: US 12,337,625 B2
(45) Date of Patent: *Jun. 24, 2025

(54) SEALANT-CONTAINING TIRE AND RELATED PROCESSES

(71) Applicant: Bridgestone Americas Tire Operations, LLC, Nashville, TN (US)

(72) Inventors: Brian S. Alexander, Westfield, IN (US); Bradley S. Plotner, Akron, OH (US); Ross W. Widenor, Munroe Falls, OH (US); Jared J. Griebel, Orange Village, OH (US); Kung-Ching Liao, San Jose, CA (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,250

(22) Filed: Jul. 10, 2023

(65) Prior Publication Data
US 2023/0347692 A1 Nov. 2, 2023

Related U.S. Application Data

(63) Continuation of application No. 16/466,949, filed as application No. PCT/US2017/066271 on Dec. 14, 2017, now Pat. No. 11,697,306.

(60) Provisional application No. 62/434,615, filed on Dec. 15, 2016.

(51) Int. Cl.
| | | |
|---|---|---|
| *B60C 1/00* | (2006.01) | |
| *B29C 73/02* | (2006.01) | |
| *B29C 73/22* | (2006.01) | |
| *B29D 30/06* | (2006.01) | |
| *B60C 5/14* | (2006.01) | |
| *B60C 19/12* | (2006.01) | |
| *B29L 30/00* | (2006.01) | |

(52) U.S. Cl.
CPC .............. *B60C 5/14* (2013.01); *B29C 73/025* (2013.01); *B29C 73/22* (2013.01); *B29D 30/06* (2013.01); *B29D 30/0685* (2013.01); *B60C 1/0008* (2013.01); *B60C 19/12* (2013.01); *B29D 2030/0686* (2013.01); *B29D 2030/0695* (2013.01); *B29L 2030/008* (2013.01)

(58) Field of Classification Search
CPC .......... B60C 19/122; B60C 19/12; B60C 1/00
See application file for complete search history.

(56) References Cited

U.S. PATENT DOCUMENTS

| | | |
|---|---|---|
| 3,903,947 A | 9/1975 | Emerson |
| 3,935,893 A | 2/1976 | Stang |
| 4,113,401 A | 9/1978 | McDonald |
| 4,113,799 A | 9/1978 | Van Ornum et al. |
| 4,116,895 A | 9/1978 | Kageyama |
| 4,300,614 A | 11/1981 | Kageyama et al. |
| 4,356,222 A * | 10/1982 | Harakawa ............. F16L 58/181 428/339 |
| 4,359,078 A | 11/1982 | Egan |
| 4,426,468 A * | 1/1984 | Ornum ............... B29D 30/0685 524/508 |
| 4,443,279 A | 4/1984 | Sandstrom |
| 4,607,065 A | 8/1986 | Kitamura et al. |
| 4,657,958 A | 4/1987 | Fieldhouse et al. |
| 4,707,526 A | 11/1987 | Sasaki et al. |
| 4,732,925 A | 3/1988 | Davis |
| 4,778,852 A | 10/1988 | Futamura |
| 4,810,565 A | 3/1989 | Wasitis et al. |
| 4,816,101 A | 3/1989 | Hong et al. |
| 4,913,209 A | 4/1990 | Hong et al. |
| 4,915,856 A | 4/1990 | Jamison |
| 4,971,831 A | 11/1990 | Ohba et al. |
| 5,085,942 A | 2/1992 | Hong et al. |
| 5,242,727 A | 9/1993 | Briddell et al. |
| 5,276,258 A | 1/1994 | Knobloch et al. |
| 5,389,715 A | 2/1995 | Davis et al. |
| 5,426,147 A | 6/1995 | Laube et al. |
| 5,556,636 A | 9/1996 | Yano et al. |
| 5,849,133 A | 12/1998 | Senderling et al. |
| 5,900,088 A | 5/1999 | Yamagiwa |
| 5,985,981 A | 11/1999 | Alexander et al. |
| 6,101,767 A | 8/2000 | Georgeau |
| 6,103,811 A | 8/2000 | Midorikawa et al. |
| 6,120,869 A | 9/2000 | Cotsakis et al. |

(Continued)

FOREIGN PATENT DOCUMENTS

| | | |
|---|---|---|
| BR | PI1102846 A2 | 7/2013 |
| CN | 1176618 A | 3/1998 |

(Continued)

OTHER PUBLICATIONS

International Search Report and Written Opinion from PCT/US2017/066271 dated Apr. 9, 2018.
International Search Report and Written Opinion from PCT/US2017/066368 dated Apr. 10, 2018.
International Preliminary Report on Patentability from PCT/US2017/38493 dated Dec. 25, 2018.
International Preliminary Report on Patentability from PCT/US2017/39516 dated Jan. 1, 2019.
International Preliminary Report on Patentability from PCT/US2017/66271 dated Jun. 18, 2019.
International Preliminary Report on Patentability from PCT/US2017/40024 dated Jan. 1, 2019.
International Preliminary Report on Patentability from PCT/US2017/66368 dated Jun. 18, 2019.

(Continued)

*Primary Examiner* — Justin R Fischer
(74) *Attorney, Agent, or Firm* — Meredith E. Hooker; Jenny L. Sheaffer

(57) ABSTRACT

Processes for producing a sealant layer-tire inner liner combination as well as a sealant layer-containing tire and related processes involving the sealant layer-containing tire are disclosed. The sealant layer is adhered to the tire inner liner, has a thickness of 2-8 mm and comprises 100 parts of at least one rubber, 300-500 phr of at least one tackifier, optionally one or more extenders, optionally at least one hydroscopic substance, and a cure package.

20 Claims, No Drawings

(56) References Cited

U.S. PATENT DOCUMENTS

| | | |
|---|---|---|
| 6,183,551 B1 | 2/2001 | Okamoto et al. |
| 6,303,694 B1 | 10/2001 | Hogan et al. |
| 6,436,498 B1 | 8/2002 | Rangwalla et al. |
| 6,500,286 B1 | 12/2002 | Carr, III et al. |
| 6,502,360 B2 | 1/2003 | Carr, III et al. |
| 6,505,455 B1 | 1/2003 | Georgeau |
| 6,530,409 B1 | 3/2003 | Ishikawa et al. |
| 6,679,018 B2 | 1/2004 | Georgeau et al. |
| 6,803,412 B2 | 10/2004 | Nguyen-Misra et al. |
| 6,923,233 B1 | 8/2005 | Girault et al. |
| 7,073,550 B2 | 7/2006 | Reiter et al. |
| 7,175,732 B2 | 2/2007 | Robinson et al. |
| 7,182,114 B2 | 2/2007 | Yukawa |
| 7,189,781 B2 | 3/2007 | Acevado et al. |
| 7,317,051 B2 | 1/2008 | Georgeau et al. |
| 7,484,544 B2 | 2/2009 | Serra et al. |
| 7,671,144 B2 | 3/2010 | Fujimoto et al. |
| 7,681,613 B2 | 3/2010 | Yukawa et al. |
| 7,717,146 B2 | 5/2010 | Yukawa et al. |
| 7,727,940 B2 * | 6/2010 | Reddy .................. C09K 8/68 507/104 |
| 7,743,808 B2 | 6/2010 | Yukawa |
| 7,767,308 B2 | 8/2010 | Georgeau et al. |
| 7,772,301 B2 | 8/2010 | Fensel et al. |
| 8,028,796 B2 | 10/2011 | Ishihara |
| 8,221,849 B2 | 7/2012 | Naito |
| 8,245,743 B2 | 8/2012 | Hahn et al. |
| 8,534,331 B2 | 9/2013 | Dubos et al. |
| 8,999,093 B2 | 4/2015 | Yukawa |
| 9,108,373 B2 | 8/2015 | Tanno et al. |
| 2001/0000788 A1 | 5/2001 | Ono et al. |
| 2002/0059971 A1 | 5/2002 | Yukawa et al. |
| 2002/0115770 A1 | 8/2002 | Georgeau et al. |
| 2004/0140030 A1 | 7/2004 | Hahn et al. |
| 2004/0214950 A1 | 10/2004 | Nakamura et al. |
| 2005/0098252 A1 | 5/2005 | Muraoka et al. |
| 2005/0107499 A1 | 5/2005 | Georgeau et al. |
| 2005/0143496 A1 | 6/2005 | Mueller |
| 2005/0155686 A1 | 7/2005 | Yukawa et al. |
| 2005/0221046 A1 | 10/2005 | Finerman |
| 2005/0284536 A1 | 12/2005 | Kojima et al. |
| 2006/0169393 A1 | 8/2006 | Botts et al. |
| 2006/0205907 A1 | 9/2006 | Guyer et al. |
| 2007/0088137 A1 | 4/2007 | Georgeau |
| 2007/0282080 A1 | 12/2007 | Kawakami et al. |
| 2008/0078489 A1 | 4/2008 | Fukutomi et al. |
| 2008/0115872 A1 | 5/2008 | Sandstrom |
| 2008/0237537 A1 | 10/2008 | Huang et al. |
| 2008/0292902 A1 | 11/2008 | Reid et al. |
| 2009/0005498 A1 | 1/2009 | Lin et al. |
| 2009/0018260 A1 | 1/2009 | Correia et al. |
| 2009/0023837 A1 | 1/2009 | Huang et al. |
| 2009/0318599 A1 | 12/2009 | Brokamp |
| 2010/0043933 A1 | 2/2010 | Breunig |
| 2010/0068530 A1 | 3/2010 | Laubry |
| 2010/0084607 A1 | 4/2010 | Cholli et al. |
| 2010/0108221 A1 | 5/2010 | Shibata et al. |
| 2010/0173167 A1 | 7/2010 | Vissing et al. |
| 2010/0227968 A1 | 9/2010 | Joseph et al. |
| 2010/0317796 A1 | 12/2010 | Huang et al. |
| 2011/0003920 A1 | 1/2011 | Matsuda et al. |
| 2011/0056694 A1 | 3/2011 | Sears et al. |
| 2011/0247674 A1 | 10/2011 | Fujii et al. |
| 2011/0308706 A1 | 12/2011 | Sandstrom et al. |
| 2012/0040191 A1 | 2/2012 | Kohl et al. |
| 2012/0123016 A1 | 5/2012 | Bolte et al. |
| 2012/0125507 A1 | 5/2012 | Bormann et al. |
| 2012/0180923 A1 | 7/2012 | Custodero et al. |
| 2012/0222789 A1 | 9/2012 | Tuffile et al. |
| 2012/0232210 A1 | 9/2012 | Cheng et al. |
| 2012/0234449 A1 | 9/2012 | Greiveldinger et al. |
| 2013/0023617 A1 | 1/2013 | Okamoto et al. |
| 2013/0032262 A1 | 2/2013 | Bormann et al. |
| 2013/0108882 A1 | 5/2013 | Stuart et al. |
| 2013/0192736 A1 | 8/2013 | Song et al. |
| 2013/0228259 A1 | 9/2013 | Breunig |
| 2013/0260146 A1 | 10/2013 | Wright et al. |
| 2014/0030537 A1 | 1/2014 | Ogasawara et al. |
| 2014/0088240 A1 | 3/2014 | Sandstrom et al. |
| 2014/0110032 A1 | 4/2014 | Ogasawara et al. |
| 2014/0124114 A1 | 5/2014 | Hayashi et al. |
| 2014/0138004 A1 | 5/2014 | Voge et al. |
| 2014/0261965 A1 | 9/2014 | Tang et al. |
| 2014/0329102 A1 | 11/2014 | Randall et al. |
| 2015/0183270 A1 | 7/2015 | Kitano et al. |
| 2015/0184045 A1 | 7/2015 | Goubard et al. |
| 2015/0273944 A1 | 10/2015 | Yukawa |
| 2015/0284610 A1 | 10/2015 | Zander et al. |
| 2015/0364720 A1 | 12/2015 | Itoh |
| 2015/0368512 A1 | 12/2015 | Bowman et al. |
| 2016/0032158 A1 | 2/2016 | Tang et al. |
| 2016/0068031 A1 | 3/2016 | Kaszas et al. |
| 2016/0340905 A1 | 11/2016 | Tang et al. |
| 2016/0362893 A1 | 12/2016 | Tang et al. |
| 2017/0050474 A1 | 2/2017 | Laubry |
| 2017/0282647 A1 | 10/2017 | Van Erp et al. |
| 2017/0291379 A1 | 10/2017 | Yukawa et al. |
| 2017/0297281 A1 | 10/2017 | Yukawa et al. |
| 2017/0305210 A1 | 10/2017 | Yukawa et al. |
| 2017/0326913 A1 | 11/2017 | Merino Lopez et al. |
| 2018/0016400 A1 | 1/2018 | Gutacker et al. |
| 2018/0201774 A1 | 7/2018 | Sugimoto et al. |
| 2019/0256745 A1 | 8/2019 | Goubard et al. |

FOREIGN PATENT DOCUMENTS

| | | | |
|---|---|---|---|
| CN | 1259094 A | 7/2000 | |
| CN | 1553866 A | 12/2004 | |
| CN | 1669783 A | 9/2005 | |
| CN | 1927608 A | 3/2007 | |
| CN | 101003186 A | 7/2007 | |
| CN | 101636290 A | 1/2010 | |
| CN | 101687437 A | 3/2010 | |
| CN | 101939349 A | 1/2011 | |
| CN | 102548743 A | 7/2012 | |
| CN | 102574434 A | 7/2012 | |
| CN | 103158437 A | 6/2013 | |
| CN | 103502375 A | 1/2014 | |
| CN | 103648798 A | 3/2014 | |
| EP | 0135463 A1 | 3/1985 | |
| EP | 160614 A * | 11/1985 | ......... B29D 30/0685 |
| EP | 0160614 A2 | 11/1985 | |
| EP | 1174251 A2 | 1/2002 | |
| EP | 1418199 A1 | 5/2002 | |
| EP | 1090069 B1 | 7/2004 | |
| EP | 1462500 A1 | 9/2004 | |
| EP | 1544254 A1 | 6/2005 | |
| EP | 2042296 A1 | 1/2009 | |
| EP | 2335911 A1 | 6/2011 | |
| EP | 2738017 A1 | 6/2014 | |
| EP | 2993061 A1 | 3/2016 | |
| EP | 3009473 A1 | 4/2016 | |
| EP | 3093165 A1 | 11/2016 | |
| FR | 2273682 A1 | 1/1976 | |
| GB | 1601065 | 10/1981 | |
| GB | 2045793 A | 5/1983 | |
| JP | S55-127212 A | 10/1980 | |
| JP | 53-97046 A | 8/1981 | |
| JP | S53-97046 A | 8/1981 | |
| JP | S60-64834 A | 4/1985 | |
| JP | H01-113483 A | 5/1989 | |
| JP | H09-187869 A | 7/1997 | |
| JP | 10087884 A | 4/1998 | |
| JP | 2002-363484 A | 12/2002 | |
| JP | 2006-007760 A | 1/2006 | |
| JP | 2008133404 A | 6/2008 | |
| JP | 2009-029972 A | 2/2009 | |
| JP | 2009215497 A | 9/2009 | |
| JP | 2009255601 A | 11/2009 | |
| JP | 2010-106159 A | 5/2010 | |
| JP | 2011-31709 A | 2/2011 | |
| JP | 2015101672 A | 6/2015 | |
| JP | 2015-131957 A | 7/2015 | |
| JP | 2016-78817 A | 5/2016 | |

(56) References Cited

FOREIGN PATENT DOCUMENTS

| | | |
|---|---|---|
| JP | 2016-514734 A | 5/2016 |
| JP | 2016-108540 A | 6/2016 |
| KR | 20020037593 A | 5/2002 |
| KR | 10-0982923 B1 | 9/2010 |
| WO | 9856598 A1 | 12/1998 |
| WO | 2000-37534 A1 | 6/2000 |
| WO | 2007/128797 A1 | 11/2007 |
| WO | 2008-013183 A1 | 1/2008 |
| WO | 2009-006915 A1 | 1/2009 |
| WO | 2009058420 A1 | 5/2009 |
| WO | 2014-095650 A1 | 8/2014 |
| WO | 2014-145482 A1 | 9/2014 |
| WO | 2014198432 A1 | 12/2014 |
| WO | 2015/075040 A1 | 3/2015 |
| WO | 2015074031 A1 | 5/2015 |
| WO | 2015/143065 A1 | 9/2015 |
| WO | 2015165899 A1 | 11/2015 |
| WO | 2016-115560 A1 | 7/2016 |
| WO | 2016-146648 A1 | 9/2016 |

OTHER PUBLICATIONS

International Preliminary Report on Patentability from PCT/US2017/66242 dated Jun. 18, 2019.
INEOS Oligomers—INDOL Polybutene Specifications and Typical, undated, downloaded Oct. 28, 2016.
Technical Information Sheet—QuickSeam Splice Tape, last modified Jul. 25, 2013.
Technical Information Sheet—EcoWhite QuickSeam Splice Tape, last modified Dec. 8, 2015.
International Search Report from PCT/US2017/38493 dated Aug. 23, 2017.
International Search Report and Written Opinion from PCT/US2017/39516 dated Aug. 28, 2017.
International Search Report and Written Opinion from PCT/US2017/66242 dated Aug. 28, 2017.
International Search Report and Written Opinion from PCT/US2017/66242 dated Mar. 30, 2018.
European Extended Search Report and Search Opinion from EP application No. 17821258.5, transmitted by the European Patent Office on Jan. 30, 2020.
European Extended Search Report and Search Opinion from EP application No. 17879743.7, transmitted by the European Patent Office on Jul. 31, 2020.
European Extended Search Report and Search Opinion from EP application No. 17880817.6 transmitted by the European Patent Office on Jul. 13, 2020.
European Extended Search Report and Search Opinion from EP application No. 17879667.8, transmitted by European Patent Office on Jul. 30, 2020.
International Search Report and Written Opinion from PCT/US2017/040024 dated Aug. 28, 2017.
Hepworth, Paul, Chemistry and Technology of Surfactants, Chapter 5 Non-ionic Surfactants, Copyright 2006.
Lee, Myung Jin, International Search Report with Written Opinion from PCT/US2017/039516, 12 pp. (Aug. 28, 2017).
Safety Data Sheet for QuickPrime Plus LVOC from Firestone Building Products Company, last revised Feb. 20, 2015.
Safety Data Sheet for QuickPrime Plus Primer from Firestone Building Products Company, last revised Jan. 29, 2016.
Safety Data Sheet for Single-Ply LVOC Primer from Firestone Building Products Company, last revised Mar. 11, 2014.
Safety Data Sheet for Single-Ply QuickPrime Primer from Firestone Building Products Company, last revised Jan. 28, 2013.
Technical Information Sheet for QuickPrime Plus LVOC from Firestone Building Products Company, last revised Feb. 13, 2012.
Technical Information Sheet for QuickPrime Plus from Firestone Building Products Company, last revised Aug. 2, 2013.
Technical Information Sheet for Single-Ply LVOC Bonding Adhesive-1168 from Firestone Building Products Company, last revised Jan. 17, 2012.
Technical Information Sheet for Single-Ply LVOC Bonding Adhesive from Firestone Building Products Company, last revised Sep. 17, 2015.
Technical Information Sheet for Single-Ply QuickPrime Primer from Firestone Building Products Company, last revised Feb. 21, 2012.
Lee, Myung Jin, International Search Report with Written Opinion from PCT/US2017/040024, 13 pp. (Aug. 28, 2017).
Jang, Gijeong, International Search Report with Written Opinion from PCT/US2017/066242, 13 pp. (Mar. 30, 2018).
Technical Information Sheet, EPDM—Solvent Free Bonding Adhesive, 4 pages, dated Nov. 7, 2016.
Technical Datasheet, Momentive Spur 1050MM, dated Sep. 10, 2011.
Marketing Bulletin, Momentive Spur 1050MM, dated Mar. 2017.
Technical Datasheet, Momentive Spur 1015LM, dated Jan. 23, 2016.
Marketing Bulletin, Momentive Spur 1015LM, dated Mar. 2017.
Kaneka MS Polymer, dated Dec. 9, 2016.
Technical Data Sheet, Geniosil STP E 30, dated Jul. 31, 2015.
Technical Data Sheet, Geniosil STP E 35, dated May 8, 2015.
Shin Etsu, Silicone Release Coatings, Shin-Etsu Integrated System, dated Oct. 2012 (8 pages).
International Search Report from PCT application No. PCT/US2017/038493, dated Aug. 2017 (3 pages).
International Preliminary Report on Patentability and Written Opinion from PCT application No. PCT/US2017/038493, dated Dec. 2018 (10 pages).
3M, Low Fogging Adhesive Transfer Tapes, Technical Data, dated Oct. 2008 (4 pages).
Yonghe, Li, pp. 31-32, excerpt from Rubber Vulcanization Technology, section 4 Vulcanizing Agents, published May 2012).
Dingzhong, et al., "Rubber Compounding Ingredients," pp. 99-100, Shanghai Scientific & Technical Publishers, Apr. 1959.
International Search Report for Application No. PCT/US2014/030257 dated Sep. 17, 2014.
Written Opinion for Application No. PCT/US2014/030257 dated Sep. 2015.
Kristalex 3100 hydrocarbon resin data sheet; Eastman Chemical Company, 2019. (Year: 2019).
Written Opinion and IPRP for Application No. PCT/US2014/066101 dated May 2015.
International Search Report for Application No. PCT/US2014/066101 dated Jan. 27, 2015.
Kristalex 3100 hydrocarbon resin technical data sheet; Eastman Chemical Company; dated Feb. 28, 2018.
Wei, Junneng (editor), User Manual for construction Machinery Tires, published 1986 by China Railway Press, Beijing, pp. 259-263.
Wang, Mengjiao et al. (editors), Handbook of Rubber Industry, 2nd volume copyright 1989, pp. 141 and 507-511.

* cited by examiner

SEALANT-CONTAINING TIRE AND RELATED PROCESSES

CROSS-REFERENCE TO RELATED APPLICATIONS

This application is a continuation of U.S. application Ser. No. 16/466,949 filed Jun. 5, 2019, and assigned U.S. Pat. No. 11,697,306 and an issue date of Jul. 11, 2023, which is a U.S. national stage of International Application Number PCT/US2017/066271, filed on Dec. 14, 2017, which application claims priority to and any other benefit of U.S. Provisional Patent Application Ser. No. 62/434,615, filed Dec. 15, 2016, and entitled "SEALANT-CONTAINING TIRE AND RELATED PROCESSES," the entire disclosure of each of which is incorporated by reference herein.

FIELD

The present application is directed to producing a sealant layer-inner liner combination, to a sealant layer-containing tire and to related processes involving the sealant layer-containing tire.

BACKGROUND

Sealants may be used in pneumatic tires to improve the operating durability (e.g., during driving) of a tire installed upon a vehicle. Use of a sealant may enable the pneumatic tire to withstand a puncture (e.g., from a sharp object such as a nail) which would otherwise cause undesirable loss of air from the tire. By incorporating a sealant into an interior portion of a pneumatic tire, one or more punctures which could otherwise cause loss of air from the tire and/or render the vehicle inoperable can be plugged by movement of the sealant into the hole created by the puncture.

SUMMARY

Disclosed herein are processes for producing a sealant layer-inner liner combination. Also disclosed herein is a sealant layer-containing tire and related processes involving the sealant layer-containing tire.

In a first embodiment, a process for producing a sealant layer-inner liner combination is provided. The process comprises: (a) providing a tire inner liner, wherein the inner liner includes a radially inward facing surface and a radially outward surface; (b) providing a sealant layer having an upper surface, a lower surface, and a thickness of 2-8 mm, and comprising a mixture of (i) 100 parts of at least one rubber selected from the group consisting of butyl rubber (optionally halogenated), natural rubber, polyisoprene, polybutadiene rubber, styrene-butadiene rubber, styrene-butadiene-isoprene rubber, isoprene-butadiene rubber, polychloroprene rubber, EPDM, nitrile rubber, polyisobutylene and combinations thereof; (ii) 90-500 phr of at least one tackifier; (iii) optionally one or more extenders in a total amount of no more than 55 phr; (iv) optionally at least one hydroscopic substance in an amount of 0.5 to 10 phr; and (v) a cure package; and (c) adhering the sealant layer either to the radially inward facing surface of the inner liner so that the lower surface of the sealant layer faces radially outward, thereby producing a tire containing sealant or to the radially outward facing surface of the inner liner so that the lower surface of the sealant layer faces radially outward.

In a second embodiment, a tire containing a sealant layer is provided. The tire comprises: one or more belts, a road-contacting tread, an inner liner with a radially inward facing surface and a radially outward facing surface, and a sealant layer having an upper surface, a lower surface, and a thickness of 2-8 mm. According to the second embodiment, the sealant layer is adhered to either the radially inward facing surface of the inner liner so that the lower surface of the sealant layer faces radially outward or to the radially outward facing surface of the inner liner so that the lower surface of the sealant layer faces radially outward, and the sealant layer comprises a mixture of (i) 100 parts of at least one rubber selected from the group consisting of butyl rubber (optionally halogenated), natural rubber, polyisoprene, polybutadiene rubber, styrene-butadiene rubber, styrene-butadiene-isoprene rubber, isoprene-butadiene rubber, polychloroprene rubber, EPDM, nitrile rubber, polyisobutylene and combinations thereof; (ii) 90-500 phr of at least one tackifier; (iii) optionally one or more extenders in a total amount of no more than 55 phr; (iv) optionally at least one hydroscopic substance in an amount of 0.5 to 10 phr; and (v) a cure package.

In a third embodiment, a process of recovering one or more components of a used tire is provided. The process comprises providing a tire containing a sealant layer according to the second embodiment and removing the sealant layer from the tire by separating the sealant layer away from the inner liner.

In a fourth embodiment, a process for repairing a punctured tire is provided. The process comprises providing a tire containing a sealant layer according to the second embodiment wherein the tire contains at least one puncture of the inner liner extending into a portion of the sealant layer. The process comprises identifying the at least one puncture; repairing the at least one puncture either by (a) removing the portion of the sealant layer surrounding the puncture thereby creating a gap in the sealant layer, and adhering a new portion of sealant to the gap; or (b) adding a new portion of sealant to the puncture; thereby repairing the punctured tire.

DETAILED DESCRIPTION

Disclosed herein are processes for producing a sealant layer-inner liner combination. Also disclosed herein is a sealant layer-containing tire and related processes involving the sealant layer-containing tire.

In a first embodiment, a process for producing a sealant layer-inner liner combination is provided. The process comprises: (a) providing a tire inner liner, wherein the inner liner includes a radially inward facing surface and a radially outward surface; (b) providing a sealant layer having an upper surface, a lower surface, and a thickness of 2-8 mm, and comprising a mixture of (i) 100 parts of at least one rubber selected from the group consisting of butyl rubber (optionally halogenated), natural rubber, polyisoprene, polybutadiene rubber, styrene-butadiene rubber, styrene-butadiene-isoprene rubber, isoprene-butadiene rubber, polychloroprene rubber, EPDM, nitrile rubber, polyisobutylene and combinations thereof; (ii) 90-500 phr of at least one tackifier; (iii) optionally one or more extenders in a total amount of no more than 55 phr; (iv) optionally at least one hydroscopic substance in an amount of 0.5 to 10 phr; and (v) a cure package; and (c) adhering the sealant layer either to the radially inward facing surface of the inner liner so that the lower surface of the sealant layer faces radially outward, thereby producing a tire containing sealant or to the radially outward facing surface of the inner liner so that the lower surface of the sealant layer faces radially outward.

In a second embodiment, a tire containing a sealant layer is provided. The tire comprises: one or more belts, a road-contacting tread, an inner liner with a radially inward facing surface and a radially outward facing surface, and a sealant layer having an upper surface, a lower surface, and a thickness of 2-8 mm. According to the second embodiment, the sealant layer is adhered to either the radially inward facing surface of the inner liner so that the lower surface of the sealant layer faces radially outward or to the radially outward facing surface of the inner liner so that the lower surface of the sealant layer faces radially outward, and the sealant layer comprises a mixture of (i) 100 parts of at least one rubber selected from the group consisting of butyl rubber (optionally halogenated), natural rubber, polyisoprene, polybutadiene rubber, styrene-butadiene rubber, styrene-butadiene-isoprene rubber, isoprene-butadiene rubber, polychloroprene rubber, EPDM, nitrile rubber, polyisobutylene and combinations thereof; (ii) 90-500 phr of at least one tackifier; (iii) optionally one or more extenders in a total amount of no more than 55 phr; (iv) optionally at least one hydroscopic substance in an amount of 0.5 to 10 phr; and (v) a cure package.

In a third embodiment, a process of recovering one or more components of a used tire is provided. The process comprises providing a tire containing a sealant layer according to the second embodiment and removing the sealant layer from the tire by separating the sealant layer away from the inner liner.

In a fourth embodiment, a process for repairing a punctured tire is provided. The process comprises providing a tire containing a sealant layer according to the second embodiment wherein the tire contains at least one puncture of the inner liner extending into a portion of the sealant layer. The process comprises identifying the at least one puncture; repairing the at least one puncture either by (a) removing the portion of the sealant layer surrounding the puncture thereby creating a gap in the sealant layer, and adhering a new portion of sealant to the gap; or (b) adding a new portion of sealant to the puncture; thereby repairing the punctured tire.

Definitions

The terminology as set forth herein is for description of the embodiments only and should not be construed as limiting the invention as a whole.

As used herein, the term "majority" means more than 50% (e.g., 50.5%, 51%, 60%, etc.) and may encompass 100%.

As used herein, the term "natural rubber" or NR means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

As used herein, the term "phr" means parts per one hundred parts rubber. 100 parts of rubber may also be referred to as 100 phr. As a non-limiting example, when an exemplary sealant composition comprises a mixture of 60 parts of butyl rubber, 40 parts of EPDM rubber, and 100 parts of polybutene tackifier, the amount of polybutene tackifier can be described as 100 phr.

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

As used herein, the term "radially inward" is a relative term indicating that a component is positioned or arranged closer to or facing the inner portion of a tire, with the understanding that the road-contacting tread is generally the radially outermost portion of a tire. As a non-limiting example, body plies within a tire are positioned radially inward of the road-contacting tread of the tire.

As used herein, the term "radially outward" is a relative term indicating that a component is positioned or arranged closer to or facing the outer portion of a tire, with the understanding that the road-contacting tread is generally the radially outermost portion of a tire. As a non-limiting example, the road-contacting tread of a tire is positioned radially outward of the body plies within a tire.

As used herein, the phrases "inner liner" and "tire inner liner" are used interchangeably.

Sealant Layer

As discussed above, according to the first embodiment, the sealant layer that is adhered to the tire inner liner has an upper surface and a lower surface. The upper surface is the surface that is intended to face radially inward when the sealant layer is assembled into a tire and the lower surface is the surface that is intended to face radially outward when the sealant layer is assembled into a tire. As also discussed above, according to the first-fourth embodiments, the sealant layer has a radially inward facing surface and a radially outward facing surface wherein either the radially outward facing surface (the lower surface) of the sealant layer is adhered to the radially inward facing surface of the inner liner or the radially inward facing surface of the sealant layer (the lower surface) is adhered to the radially outward facing surface of the inner liner. When the radially inward facing surface of the sealant layer is adhered to the radially outward facing surface of the inner liner, the opposite surface of the sealant layer (i.e., the upper surface or the radially outward facing surface) faces the remainder of the tire (e.g., the sealant layer is between the inner liner and the remainder of the tire). According to the first-fourth embodiments, the thickness of the sealant layer is 2 to 8 mm (e.g., 2, 2.5, 3, 3.5, 4, 4.5, 5, 5.5, 6, 6.5, 7, 7.5, or 8 mm). In certain embodiments of the first-fourth embodiments, the thickness of the sealant layer is 3-6 mm, 3-5 mm, 3-4 mm, or 4-5 mm. The thicknesses referred to herein can be measured from the upper surface (which becomes radially inward facing) of the sealant layer to the lower surface (which becomes radially outward facing) of the sealant layer such as by the use of calipers. The foregoing thicknesses are also intended to encompass the overall thickness of the sealant layer for those embodiments of the first-fourth embodiments wherein the upper surface of the sealant layer (radially inward facing surface) further comprises an outwardly facing detackifier coating since, as described in further detail below, such a coating will generally be thin (e.g., less than 0.1 mm, less than 0.05 mm). In certain embodiments of the first-fourth embodiments, the thickness of the sealant layer across its width varies by no more than 10%, no more than 5%, no more than 3%, or even no more than 2%. In other words, the thickness of such a sealant layer is substantially consistent across its width and measurements taken at five or more places across its width having a thickness (according to one of the foregoing sizes) vary by no more than 10%, no more than 5%, no more than 3%, or even no more than 2%. In other embodiments of the first-fourth embodiments, the thickness of the sealant layer across its width varies with a center portion being the thickest; in certain such embodiments the center portion has a thickness according to one of the ranges or values discussed above. In certain embodiments of the first-fourth embodiments wherein the thickness of the sealant layer varies across its width and the center portion has a thickness according to one the ranges or values discussed above, the thickness tapers on an outward basis with the outer edges of the sealant layer being the thinnest. In certain embodiments, the center portion of the sealant layer comprises 25-75% (e.g., 25%, 30%, 35%, 40%, 45%, 50%, 55%, 60%, 65%, 70%, 75%) of the overall width of the sealant layer and in other embodiments 40-60% of the overall width and includes thinner edges on each side of the center portion. In certain embodiments of the first-fourth embodiments, the center portion may constitute an inner portion having thinner edges on each side of the inner portion but may not be centered (e.g., the width of each edge portion is not equivalent).

In certain embodiments of the first embodiment, the sealant layer that is provided has a width that varies by no more than 5% from the width of the radially inward facing surface of the inner liner of the tire as measured from belt-edge-to-belt-edge. Utilizing such a sealant layer can be advantageous in that only one strip (or circumferential revolution) of sealant layer need be used to adhere to the inner layer of the tire thereby avoiding the use of thinner strips of sealant which require multiple strips or must at least be applied in multiple circumferential revolutions around the inner liner surface to sufficiently cover the inner liner surface (e.g., the width of the radially inward facing surface of the inner liner as measured from belt-edge-to-belt-edge or a width no more than 5% less thereof). In certain embodiments of the second-fourth embodiments, the sealant layer of the tire has a width that varies by no more than 5% from the width of the radially inward facing surface of the inner liner of the tire as measured from belt-edge-to-belt-edge. In certain embodiments of the first-fourth embodiments, the sealant layer has a width that varies by no more than 4%, no more than 3%, no more than 2%, or no more than 1% from the width of the radially inward facing surface of the inner liner of the tire as measured from belt-edge-to-belt-edge. In certain embodiments of the first-fourth embodiments, the sealant layer has a width equivalent to the width of the radially inward facing surface of the inner liner of the tire as measured from belt-edge-to-belt-edge. In certain embodiments of the first-fourth embodiments, the sealant layer has a width that is suitable for use with a passenger tire such as a width of 5-25 cm (e.g., 5, 8, 10, 12, 15, 17, 20, 22, 25 cm) or 8-20 cm. In certain embodiments of the first-fourth embodiments, the sealant layer has a width that is suitable for use with a truck or bus tire such as a width of 15-60 cm (e.g., 15, 20, 25, 30, 35, 40, 45, 50, 55, 60 cm) or 20-50 cm.

According to the first-fourth embodiments, the sealant layer comprises a mixture of ingredients as follows: (i) 100 parts of at least one rubber selected from the group consisting of butyl rubber (optionally halogenated), natural rubber, polyisoprene, polybutadiene rubber, styrene-butadiene rubber, styrene-butadiene-isoprene rubber, isoprene-butadiene rubber, polychloroprene rubber, EPDM, nitrile rubber, polyisobutylene and combinations thereof; (ii) 90-500 phr of at least one tackifier; (iii) optionally one or more extenders in a total amount of no more than 55 phr; (iv) optionally at least one hydroscopic substance in an amount of 0.5 to 10 phr; and (v) a cure package. As discussed in more detail herein, according to certain embodiments of the first-fourth embodiments, the sealant layer may further comprise (include) one or more of: a barrier layer upon its lower surface (which becomes radially outward facing), a removable backing upon its lower surface (which becomes radially outward facing), or a detackifier coating upon its upper surface.

In preferred embodiments of the first-fourth embodiments, the composition of the sealant layer including its upper surface (which becomes radially inward facing), its lower surface (which becomes radially outward facing) as well as the portion therebetween has a uniform composition of ingredients. In other words, in such embodiments, the upper surface (which becomes radially inward facing), the lower surface (which becomes radially outward facing) as well as the portion of the sealant layer therebetween the surfaces are made from the same mixture of ingredients. (The upper surface of the sealant layer, lower surface of the sealant layer and portion therebetween can be referred to as the rubber portion of the sealant layer.) In such embodiments, any additional component of the sealant layer that is present such as the barrier layer, the detackifier coating, and the removable backing will have a composition which differs from that of the rubber portion. As discussed in further detail herein, in certain embodiments of the first-fourth embodiments less than the entire rubber portion of the sealant layer is cured (e.g., the upper surface of the sealant layer may be cured and the remainder (the lower surface and the portion between the upper and lower surfaces) may be uncured; in such embodiments even though the portions of the sealant layer are in different forms (i.e., cured versus uncured) their composition or the mixture of ingredients from which they are made can be considered to be the same.

The mixture of ingredients which comprises the sealant layer may be prepared using standard mixing processes. Various mixing processes can be used for combining the ingredients of the rubber portion. In certain embodiments, the mixture of ingredients that comprises the sealant layer is prepared by a process that comprises: providing ingredients including rubber(s), tackifiers, any extender, and any hydroscopic substance, and mixing to form a masterbatch which results in a mixture used to form the rubber portion. In certain such embodiments, a final batch is prepared from the masterbatch by adding the cure package ingredients thereto and mixing, resulting in the final mixture used to form the sealant layer.

In certain embodiments, more than one masterbatch stage may be utilized, e.g., an initial masterbatch followed by at least one additional masterbatch step. The foregoing process options may also (optionally) be utilized in preparing the mixture of ingredients that comprises the sealant layer.

The preparation of the masterbatch(es) and the final batch may generally involve mixing together the ingredients for the rubber portion (as disclosed above) by methods known in the art, such as, for example, by kneading the ingredients together in a Banbury mixer, kneader, or on a milled roll. The term masterbatch as used herein is intended to refer to a non-productive mixing stage, which is known to those of skill in the art and generally understood to be a mixing stage where no vulcanizing agents or vulcanization accelerators are added. The term final batch as used herein is intended to refer to a productive mixing stage, which is also known to those of skill in the art and generally understood to be the mixing stage where the vulcanizing agents and vulcanization accelerators are added into the mixture.

In certain embodiments, the mixture of ingredients that comprises the sealant layer of the first-fourth embodiments is prepared by a process including master batch mixing stage(s) conducted at a temperature of about 80° C. to about 150° C. (e.g., 80, 90, 100, 110, 120, 130, 140 or 150° C.). In certain embodiments, the mixture of ingredients that comprises the sealant layer of the first-fourth embodiments is prepared by a process that also includes a final mixing stage conducted at a temperature below the vulcanization temperature in order to avoid unwanted pre-cure of the sealant composition. Therefore, the temperature of the productive (or final) mixing stage should not exceed about 160° C. (e.g., 80, 90, 100, 110, 120, 130, 140, 150, 160° C.) and is typically about 80° C. to about 150° C. In certain embodiments, the mixture of ingredients that comprises the sealant layer of the first-fourth embodiments is prepared by a process including at least two master batch mixing stages (which may be conducted at the foregoing temperature).

Rubber

As discussed above, according to the first-fourth embodiments, the sealant layer comprises a mixture of ingredients including 100 parts of at least one rubber selected from the group consisting of butyl rubber (optionally halogenated), natural rubber, polyisoprene, polybutadiene rubber, styrene-butadiene rubber, styrene-butadiene-isoprene rubber, isoprene-butadiene rubber, polychloroprene rubber, EPDM, nitrile rubber, polyisobutylene and combinations thereof. In certain embodiments of the first-fourth embodiments, any polybutadiene rubber used in the mixture for the sealant layer preferably has at least 90% cis bond content, even more preferably at least 95% cis bond content. Polyisobutylenes suitable for use as a rubber in the mixture of ingredients comprising the sealant layer of the first-fourth embodiments are those with a number average molecular weight (Mn) of greater than 100,000 grams/mole, preferably at least 250,000 grams/mole; in certain such embodiments, the polyisobutylene rubber has a Mn of up to 5,000,000. Generally, polyisobutylenes having lower Mn values exhibit less elastomeric or rubber-like properties and instead have properties more suitable for use as a tackifier.

By stating that the at least one rubber may include butyl rubber (optionally halogenated) is meant that the at least one rubber may comprise, at least one butyl rubber, at least one halogenated butyl rubber, or a combination thereof. Butyl rubber is a copolymer of isobutylene and a small amount of a diene-based monomer, typically isoprene or para-methylstyrene. The polymer chains of butyl rubber therefore typically have a highly saturated backbone. Butyl rubber typically contains more than about 90% isobutylene and less than about 10% diene-based monomer (e.g., isoprene or para-methylstyrene) by weight in the copolymer, including about 90-99.5% isobutylene and about 10 to about 0.5% diene-based monomer, about 95-99.5% isobutylene and about 5-0.5% diene-based monomer, about 96-99% isobutylene and about 4-1% diene-based monomer, about 97-98.5% isobutylene and about 1.5-3% diene-based monomer, and including about 98% isobutylene and about 2% diene-based monomer by weight in the copolymer. Typically, the diene-based mer (e.g., isoprenyl or para-methylstyrenyl) units are distributed randomly in the polymer chains of butyl rubber. Non-limiting examples of suitable butyl rubbers for use as the at least one rubber of the mixture comprising the sealant layer according to certain embodiments of the first-fourth embodiments disclosed herein include, but are not limited to, butyl rubber, chlorobutyl rubber, bromobutyl rubber, fluorobutyl rubber, iodobutyl rubber, copolymers thereof, and combinations thereof. In certain embodiments of the first-fourth embodiments, the at least one rubber comprises bromobutyl rubber. In other embodiments of the first-fourth embodiments, the at least one rubber comprises non-halogenated butyl rubber; in certain such embodiment, no halogenated butyl rubber is included in the rubber of the mixture comprising the sealant layer.

In certain embodiments of the first-fourth embodiments, the 100 parts of at least one rubber in the mixture of ingredients comprising the sealant layer comprises a majority by weight of butyl rubber (optionally halogenated), EPDM, or a combination thereof. In certain embodiments of the first-fourth embodiments, the 100 parts of at least one rubber in the mixture of ingredients comprising the sealant layer comprises at least 60 parts of butyl rubber (optionally halogenated), EPDM, or a combination thereof; alternatively stated such a mixture can be described as having at least 60% by weight of the rubber comprising butyl rubber (optionally halogenated), EPDM, or a combination thereof. In certain embodiments of the first-fourth embodiments, the 100 parts of at least one rubber in the mixture of ingredients comprising the sealant layer comprises at least 70 parts, at least 80 parts, at least 85 parts, at least 90 parts, at least 95 parts, at least 98 parts, or at least 99 parts of butyl rubber (optionally halogenated), EPDM, or a combination thereof. In certain embodiments of the first-fourth embodiments, the entire 100 parts of at least one rubber in the mixture of ingredients comprising the sealant layer comprises butyl rubber (optionally halogenated), EPDM, or a combination thereof. In certain embodiments of the first-fourth embodiments according to the foregoing (i.e., wherein 60 parts or more of the rubber comprises butyl rubber, halogenated butyl rubber, EPDM rubber, or a combination thereof), the 90-300 phr of at least one tackifier is selected from polybutene (as described further below), low molecular weight polyisobutylene (as described further below), liquid EPDM (as described further below) or a combination thereof.

In certain embodiments of the first-fourth embodiments, the 100 parts of at least one rubber in the mixture of ingredients comprising the sealant layer includes no more than 20 parts, no more than 10 parts, or no more than 5 parts of nitrile rubber. In certain embodiments of the first-fourth embodiments, the 100 parts of at least one rubber in the mixture of ingredients comprising the sealant layer includes 0 parts or 0 phr of nitrile rubber (i.e., the rubber does not include nitrile rubber and, hence, the overall mixture can be described as free of nitrile rubber). Use of large amounts of nitrile rubber in the sealant layer may inhibit its sealant properties.

In certain embodiments of the first-fourth embodiments, the 100 parts of at least one rubber in the mixture of ingredients comprising the sealant layer includes less than 10 parts, less than 5 parts, less than 1 part, or even 0 parts of any block copolymer elastomer. As used herein, the phrase block copolymer elastomer includes polymers comprising at least one segment of a styrenic polymer and at least one segment of an elastomeric saturated olefin polymer (non-limiting examples of which include the G1600 and G1700 rubbers available from Kraton Polymers, LLC of Houston, Texas).

Tackifier

As discussed above, according to the first-fourth embodiments, the sealant layer comprises a mixture of ingredients including 90 to 500 phr (e.g., 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 phr) of at least one tackifier. According to the first-fourth embodiments, one more or more than tackifier may be utilized. In certain embodiments of the first-fourth embodiments, the sealant layer comprises a mixture of ingredients including 110-210 phr (e.g., 110, 120, 130, 140, 150, 160, 170, 180, 190, 200, 210 phr) of at least one tackifier or 120-190 phr (e.g., 120, 130, 140, 150, 160, 170, 180, 190 phr) of at least one tackifier. In certain embodiments of the first-fourth embodiments, the sealant layer comprises a mixture of ingredients including 300-450 phr (e.g., 300, 310, 320, 330, 340, 350, 360, 370, 380, 390, 400, 410, 420, 430, 440, or 450 phr) of at least one tackifier.

The particular tackifier or tackifiers utilized in the mixture comprising the sealant layer of the first-fourth embodiments may vary. As used herein, the term tackifier encompasses hydrocarbons resins (e.g., natural resins, synthetic resins, and combinations thereof) as well as low molecular weight polymer or oligomers. In certain embodiments of the first-fourth embodiments, when a low molecular weight polymer or oligomer is utilized as a tackifier in the mixture comprising the sealant layer, such an ingredient can be understood as having a weight average molecular weight or Mw of 700-150,000 grams/mole, a Mw of 1000-100,000 grams/mole, or a Mw of 1,500-75,000 grams/mole; and/or a Mn of 500-100,000 grams/mole, a Mn of 700-90,000 grams/mole, or a Mn of 900-50,000 grams/mole. Mw and Mn values referred to herein can be determined by gel permeation chromatography (GPC) calibrated with polystyrene standards.

In certain embodiments of the first-fourth embodiments, the at least one tackifier of the sealant layer comprises at least one low molecular weight polymer or oligomer comprised of aliphatic monomer(s), aromatic monomer(s), or a combination thereof. One or more of each type of monomer may be used, as well as combinations thereof. The aliphatic monomer may be a linear, branched or cycloaliphatic monomer. Exemplary aliphatic monomers include: C4 paraffins, C5 paraffins, C6 paraffins, olefins, conjugated diener, and combinations thereof. More specific examples of aliphatic monomers include: 1,3-butadiene; butene; isobutylene; 1,3-pentadiene; 1,4-pentadiene; cyclopentane; 1-pentene; 2-pentene; 2-methyl-1-pentene; 2-methyl-2-butene; 2-methyl-2-pentene; isoprene; cyclohexane; 1,3-hexadiene; 1,4-hexadiene; cyclopentadiene; dicyclopentadiene; and combinations thereof. The aromatic monomer may be optionally substituted with one or more hydrocarbon groups. Exemplary aromatic monomers include: styrene, indene, C8 aromatics, C9 aromatics; C10 aromatics; and combinations thereof. In certain embodiments of the first-fourth embodiments, the at least one tackifer includes at least one low molecular weight polymer or oligomer selected from polybutene (as described in further detail below), low molecular weight polyisobutylene (as described in further detail below), liquid EPDM (as described in further detail below), liquid or low molecular weight polyisoprene (as described in further detail below), liquid or low molecular weight styrene-butadiene (as described in further detail below), liquid or low molecular weight polybutadiene (as described in further detail below), or a combination thereof.

In certain embodiments of the first-fourth embodiments, the at least one tackifier comprises (includes) liquid EPDM. Liquid EPDMs suitable for use as a tackifer in the first-fourth embodiments will generally be liquid or flowable at room temperature (23° C.). Suitable liquid EPDMs for use as a tackifer are commercially available, including, but not limited to, Trilene® liquid EPDMs from Lion Elastomers (e.g., Trilene® 67, Trilene® 77). In certain embodiments of the first-fourth embodiments, the liquid EPDM has a viscosity of 50,000 to 150,000 centipoise, or 90,000 to 130,000 centipose (Brookfield viscosity, measured at 100° C.). In certain embodiments of the first-fourth embodiments, the liquid EPDM has a Mw of 20,000 to 100,000 grams/mole (e.g., 20,000; 25,000; 30,000; 40,000; 50,000; 60,000; 70,000; 80,000; 90,000; 100,000), or 25,000 to 75,000 grams/mole.

In certain embodiments of the first-fourth embodiments, the at least one tackifier comprises (includes) liquid or low molecular weight polyisoprene. In certain embodiments of the first-fourth embodiments, the liquid or low molecular weight polyisoprene has a Mw of 15,000 to 100,000 grams/mole (e.g., 15,000; 20,000; 30,000; 40,000; 50,000; 60,000; 70,000; 80,000; 90,000; 100,000), or 25,000 to 80,000 grams/mole. Liquid or low molecular weight polyisoprenes suitable for use as a tackifer are commercially available, including, but not limited to, Isolene® polyisoprenes (e.g., Isolene® 40-S, Isolene® 400-S) from Royal Adhesives & Sealant; DPR® polyisoprenes (e.g., DPR® 35, DPR® 40, and DPR® 75) from DPR Industries; and from Kuraray Co., Ltd. (e.g., LIR-30 and LIR-50).

In certain embodiments of the first-fourth embodiments, the least one tackifier comprises (includes) liquid or low molecular weight styrene-butadiene. In certain embodiments of the first-fourth embodiments, the liquid or low molecular weight styrene-butadiene has a Mw of 5,000 to 70,000 grams/mole (e.g., 5,000; 7,500; 10,000; 20,000; 30,000; 40,000; 50,000; 60,000; 70,000) or 7,500 to 50,000 grams/mole. Liquid or low molecular weight styrene-butadienes suitable for use as a tackifier are commercially available, including, but not limited to from Kura ray Co., Ltd. (e.g., L-SBR-820 and L-SBR-841).

In certain embodiments of the first-fourth embodiments, the least one tackifier comprises (includes) liquid or low molecular weight polybutadiene. In certain embodiments of the first-fourth embodiments, the liquid or low molecular weight polybutadiene has a Mw of 5,000 to 70,000 grams/mole (e.g., 5,000; 7,500; 10,000; 20,000; 30,000; 40,000; 50,000; 60,000; 70,000) or 7,500 to 50,000 grams/mole. Liquid or low molecular weight polybutadienes suitable for use as a tackifier are commercially available, including, but not limited to from Kuraray Co., Ltd. (e.g., LBR-307, LBR-305, and LBR-352). In certain embodiments of the first-fourth embodiments, the at least one tackifier comprises (includes) a low molecular weight polybutadiene which has been functionalized with a polar group-containing compound. In other embodiments of the first-fourth embodiments, the at least one tackifier comprises (includes) another (i.e., other than polybutadiene) low polymer (as discussed above) which has been functionalized with a polar-group-containing compound; as a non-limiting example the low molecular weight polyisoprenes discussed above could be functionalized with a polar group-containing compound. Non-limiting examples of suitable polar group-containing compounds include anhydride-containing compounds (e.g., maleic anhydride or succinic anhydride), carboxylic acid-containing compounds, phosphorous-containing compounds (e.g., phosphonic acid or derivates thereof including phosphate compounds), and nitrogen-containing compounds (e.g., containing an substituted or unsubstituted amino group, an amide residue, an isocyanate group, an imidazolyl group, an indolyl group, a nitrile group, a pyridyl group, and a ketimine group). The foregoing substituted or unsubstituted amino group should be understood to include a primary alkylamine, a secondary alkylamine, or a cyclic amine, and an amino group derived from a substituted or unsubstituted imine. Various of the foregoing polar group-functionalized low molecular weight polymers are commercially available, non-limiting examples of which include polybutadiene products sold by Synthomer under the tradename Lithene® (e.g., Lithene® Ultra AL-15MA, Lithene® Ultra N4-5000-10MA, Lithene® Ultra N4-5000-10MA, and Lithene® Ultra-PM4-7.5MA) and polyisoprenes sold by Kuraray under the designations LIR-403 and LIR-410. In certain embodiments of the first-fourth embodiments, the low molecular weight polymer is a maleic anhydride functionalized polybutadiene having a Mn of 1200 to 10,000 grams/mole (e.g., 1200, 1500, 1800, 2000, 2500, 3000, 3500, 4000, 4500, 5000, 5500, 6000, 6500, 7000, 7500, 8000, 8500, 9000, 9500, or 10,000 grams/mole), or 1200 to 5,000 grams/mole (e.g., 1200, 1500, 1800, 2000, 2500, 3000, 3500, 4000, 4500, 5000, grams/mole). In certain embodiments of the first-fourth embodiments, the low molecular weight polymer is a maleic anhydride functionalized polybutadiene having a viscosity at 25° C. of 10-1000 dPa·s (e.g., 10, 20, 30, 40, 50, 60, 70, 80, 90, 100, 200, 300, 400, 500, 600, 700, 800, 900 or 1000 dPa·s. When a maleic anhydride functionalized polybutadiene is used, the amount of maleic anhydride functionalization may be measured in terms of how many parts of maleic anhydride are adducted with the polybutadiene. In certain embodiments of the first-fourth embodiments, the low molecular weight polymer is a maleic anhydride functionalized polybutadiene having 5-25 parts (e.g., 5, 10, 15, 20, or 25 parts) adducted maleic anhydride, or 10-20 parts adducted maleic anhydride. In certain embodiments of the first-fourth embodiments, the maleic anhydride functionalized polybutadiene (or another polar group functionalized low molecular weight polymer) is present in the mixture of the sealant layer in an amount of 5-100 phr (e.g., 5, 10, 15, 20, 25, 30, 35, 40, 45, 50, 55, 60, 65, 70, 75, 80, 85, 90, 95, or 100 phr) or more preferably 10-50 phr (e.g., 5, 10, 15, 20, 25, 30, 35, 40, 45, or 50 phr). The use of a low molecular weight polymer which has been functionalized with a polar group-containing compound (e.g., maleic anhydride functionalized polybutadiene), provides more favorable interaction with the metal surface of a nail which has punctured a tire containing the sealant layer. Various metals are known to be in common use in nails, including, but not limited to steel, stainless steel, aluminum, titanium, zinc, hafnium, as well as the remaining 1st and 2nd row transition metals; it is believed that the use of a low molecular weight polymer which has been functionalized with a polar group-containing compound will provide more favorable interaction with a nail containing any one or more of these metals.

In certain embodiments of the first-fourth embodiments, the least one tackifier comprises (includes) a low molecular polymer which is a copolymer of at least one polar monomer and at least one non-polar monomer; such a copolymer can be referred to as a low molecular weight polar/non-polar copolymer or simply as a polar/non-polar copolymer. In certain embodiments of the first-fourth embodiments, the tackifier includes a polar/non-polar copolymer having a molecular weight Mw of 40,000 to 120,000 grams/mole (e.g., 40,000; 50,000; 60,000; 70,000; 80,000; 90,000; 100,000; 110,000; or 120,000 grams/mole), or a Mw of 50,000 to 100,000 (e.g., 50,000; 60,000; 70,000; 80,000; 90,000; or 100,000; grams/mole). In certain embodiments of the first-fourth embodiments, the non-polar monomer comprises a diene. Non-limiting examples of suitable diener include vinyl, ethylene, propylene, and octadecene. Non-limiting examples of polar monomers which may be used in combination with the non-polar monomer or diene include, but are not limited to, acetates (such as vinyl acetate), anhydrides (such as maleic anhydride), N-containing moieties including both aromatic and non-aromatic rings (such as pyrrolidones, pyridines, pyridine N-oxide), or ketones (such as methyl ketone). Exemplary polar/non-polar copolymers that may be suitable for use in the tackifier include, but are not limited to, poly(ethylene-co-vinylacetate), poly(vinyl methyl ketone), poly(maleic anhydride 1-octadecene), poly (vinylpyridine), poly(2-vinylpyridine N-oxide), poly(4-vinylpyridine N-oxide), poly(N-vinylpyrrolidone), and combinations thereof. In certain embodiments of the first-fourth embodiment, the polar/non-polar copolymer is present in the mixture of the sealant layer in an amount of 5-100 phr (e.g., 5, 10, 15, 20, 25, 30, 35, 40, 45, 50, 55, 60, 65, 70, 75, 80, 85, 90, 95, or 100 phr) or more preferably 10-50 phr (e.g., 5, 10, 15, 20, 25, 30, 35, 40, 45, or 50 phr).

In certain embodiments of the first-fourth embodiments, the at least one tackifier comprises (includes) polybutene. In certain embodiments of the first-fourth embodiments, up to 200 phr of the at least one tackifier comprises polybutene. In certain embodiments of the first-fourth embodiments, polybutene is present in an amount of up to 200 phr of the up to 300 phr of tackifier present in the mixture that comprises the sealant layer. In certain embodiments of the first-fourth embodiments, a majority by weight (e.g., at least 51%, at least 60%, at least 70%, at least 80%, at least 90%, at least 95%, at least 98%, or even 100% by weight) of the tackifier is polybutene. Suitable polybutenes for use as a tackifier are commercially available, including, but not limited to, Indopol® polybutenes from INEOS Oligomers (e.g., H-100, H-300, H-1500, H-1900). In certain embodiments of the first-fourth embodiments wherein the tackifier includes polybutene, the polybutene has a Mn of 500-10,000 grams/mole or 500-5,000 grams/mole.

In certain embodiments of the first-fourth embodiments, the at least one tackifier comprises (includes) low molecular weight polyisobutylene. As used herein, the phrase low molecular weight polyisobutylene (LMW polyisobutylene) refers to polyisobutylenes having a Mn of 100,000 grams/mole or less, and in certain embodiments a Mn of less than 50,000 grams/mole. In certain embodiments of the first-fourth embodiments, LMW polyisobutylene is included in the at least one tackifier in an amount up to 30% by weight of the tackifier, up to 25% by weight of the tackifier, up to 20% by weight of the tackifier, up to 15% by weight of the tackifier, or up to 10% by weight of the tackifier; in certain such embodiments, the LMW polyisobutylene is used in combination with polybutene, optionally in one of the amounts discussed above. In those embodiments of the first-fourth embodiments wherein LMW polyisobutylene is included in the at least one tackifier, phr amounts of the LMW polyisobutylene can be calculated by multiplying the total phr of tackifier by the weight percentage made up of LMW polyisobutylene (e.g., if 90 phr of total tackifier are present then exemplary amounts of LMW polyisobutylene would be up to 27 phr, up to about 22 phr, up to 18 phr, up to about 13 phr, or up to 9 phr, and if 300 phr of total tackifier are present then exemplary amounts of LMW polyisobutylene would be up to 90 phr, up to 75 phr, up to 60 phr, up to 45 phr, or up to 30 phr) and such amounts and ranges should be considered to be fully disclosed herein. Suitable LMW polyisobutylenes for use as a tackifier are commercially available, including, but not limited to Oppanol® B series polyisobutylenes from BASF (e.g., B10, B15). In certain embodiments of the first-fourth embodiments, wherein the tackifier includes LMW polyisobutylene, the LMW polyisobutylene has a Mn of 20,000 to 100,000 grams/mole, 30,000 to 90,000 grams/mole, or 30,000 to 50,000 grams/mole.

In certain embodiments of the first-fourth embodiments, the at least one tackifier of the mixture that comprises the sealant layer comprises (includes) at least one resin selected from the group consisting of phenolic resins, aliphatic resins, cycloaliphatic resins, aromatic resins, terpene resins, guayule resins, and combinations thereof. In certain embodiments of the first-fourth embodiments, at least one of the foregoing resins is used in combination with polybutene as tackifiers in the mixture that comprises the sealant layer. In certain embodiments of the first-fourth embodiments, at least one of the foregoing resins is used in combination with polybutene and LMW polyisobutylene as tackifiers in the mixture that comprises the sealant layer. In certain embodiments of the first-fourth embodiments, at least one of the foregoing resins is included in the at least one tackifier in a total amount up to 20% by weight of the tackifier, up to 15% by weight of the tackifier, up to 10% by weight of the tackifier, or up to 5% by weight of the tackifier; in certain such embodiments, the at least one resin is used in combination with polybutene or in combination with polybutene and LMW polyisobutylene as tackifiers.

In certain embodiments of the first-fourth embodiments, the at least one tackifier comprises at least one resin selected from: (1) phenolic resins such as phenol novolak resins, phenol-formaldehyde resins, resorcinol-formaldehyde resins, reactive resol resins (which can react with unsaturation in an elastomer or rubber to contribute to crosslinking), and reactive novolak type phenol-formaldehyde resins (which can crosslink with methylene donors); (2) aliphatic resins such as such as C5 and/or C9 fraction homopolymer or copolymer resins, optionally in combination with one or more of e.g., cycloaliphatic, aromatic, hydrogenated aromatic, or terpene resins and/or optionally partially or fully hydrogenated; (3) cycloaliphatic resins (such as cyclopentadiene ("CPD") homopolymer or copolymer resins, and dicyclopentadiene ("DCPD") homopolymer or copolymer resins), optionally in combination with one or more of aliphatic, aromatic, hydrogenated aromatic, or terpene resins, and/or optionally partially or fully hydrogenated; (4) aromatic resins (such as coumarone-indene resins and alkylphenol resins as well as vinyl aromatic homopolymer or copolymer resins such as those including one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene or any vinyl aromatic monomer resulting from C9 fraction or C8-C10 fraction), optionally in combination with one or more of aliphatic, cycloaliphatic, hydrogenated aromatic, or terpene resins, and/or optionally partially or fully hydrogenated; (5) terpene resins (such as alpha-pinene resins, beta-pinene resins, limonene resins (e.g., L-limonene, D-limonene, dipentene which is a racemic mixture of L- and D-isomers), beta-phellandrene, delta-3-carene, and delta-2-carene), optionally in combination with one or more of aliphatic, cycloaliphatic, aromatic, or hydrogenated aromatic resins, and/or optionally partially or fully hydrogenated; or (6) guayule resins. In certain embodiments of the first-fourth embodiments, more than one of a particular type of the foregoing resins are utilized as tackifiers and in other embodiments more than one each of at least two particular types of the foregoing resins are utilized as tackifiers. In certain embodiments of the first-fourth embodiments, the tackifier comprises (includes) a phenolic resin.

Extender

As discussed above, according to the first-fourth embodiments, the mixture that comprises the sealant layer may optionally include one or more extenders. According to the first-fourth embodiments, one or more than one extender may be utilized (e.g., two, three, four, or more). By stating that the mixture comprising the sealant layer may optionally include one or more extenders is meant that in certain embodiments, the mixture of the sealant layer includes one or more extenders and in other embodiments the mixture of the sealant layer includes no extenders. As used herein, the term extender refers to a generally inert ingredient used to provide bulk to the mixture that comprises the sealant layer. In certain embodiments according to the first-fourth embodiments, the one or more extenders are non-reinforcing extenders which are generally less expensive than reinforcing extenders. In certain embodiments according to the first-fourth embodiments wherein at least one extender is present, the total amount of reinforcing extender is no more than 20 phr, no more than 15 phr, no more than 10 phr, no more than 5 phr or even 0 phr. Limiting the amount of reinforcing extender utilized (or even entirely avoiding the use of reinforcing extenders) may be preferable in certain embodiments of the first-fourth embodiments in order to avoid unduly increasing the viscosity of the sealant layer and/or an increased modulus thereof which can adversely impact sealing performance. In other embodiments according to the first-fourth embodiments, the one or more extenders may include at least one reinforcing extender. As used herein, the term reinforcing extender refers to an ingredient which when added to a rubber composition provides an improvement in one or more properties such as abrasion resistance, tear strength, or aging resistance. The term non-reinforcing extender can also be understood to refer to a particulate material that has a nitrogen surface area of less than about 20 $m^2/g$ (including less than 20 $m^2/g$), and in certain embodiments less than about 10 $m^2/g$ (including less than 10 $m^2/g$); reinforcing extenders will have surface areas higher than the foregoing. The nitrogen surface area of particulate extender materials can be determined according to various standard methods (including ASTM D6556 or D3037). In certain embodiments of the first-fourth embodiments disclosed herein, the term non-reinforcing extender is additionally or alternatively used to refer to a particulate material that has a particle size of greater than about 1000 nm (including greater than 1000 nm); reinforcing extenders will have particle sizes less than the foregoing.

In those embodiments of the first-fourth embodiments wherein the mixture that comprises the sealant layer includes one or more extenders, the total amount of extender(s) may vary. In certain embodiments of the first-fourth embodiments, the mixture that comprises the sealant layer includes one or more extenders in a total amount of no more than 55 phr (e.g., 1 phr, 5 phr, 10 phr, 15 phr, 20 phr, 25 phr, 30 phr, 35 phr, 40 phr, 45 phr, 50 phr, or 55 phr) or 1-55 phr. In other embodiments of the first-fourth embodiments, the mixture that comprises the sealant layer includes one or more extenders in a total amount of no more than 35 phr (e.g., 1 phr, 5 phr, 10 phr, 15 phr, 20 phr, 25 phr, 30 phr, 35 phr). Limiting the total amount of extender (even if mostly or all non-reinforcing extender(s) are utilized) may be preferable in certain embodiments of the first-fourth embodiments in order to avoid unduly increasing in the viscosity of the sealant layer and/or an increased modulus thereof which can adversely impact sealing performance.

In those embodiments of the first-fourth embodiments wherein the mixture that comprises the sealant layer includes one or more extenders, the particular extender or extenders utilized may vary. In certain embodiments of the first-fourth embodiments, the mixture that comprises the sealant layer includes one or more extenders selected from: carbon black, silica, talc, clay, graphite, alumina ($Al_2O_3$), aluminum hydrate ($Al_2O_3H_2O$), aluminum hydroxide (Al (OH)$_3$), aluminum carbonate (Al$_2$(CO$_3$)$_2$), aluminum nitride, aluminum magnesium oxide (MgOAl$_2$O$_3$), pyrofilite (Al$_2$O$_3$4SiO$_2$—H$_2$O), bentonite (Al$_2$O$_3$·4SiO$_2$·2H$_2$O), boron nitride, silicon nitride, aluminum nitride, mica, kaolin, glass balloon, glass beads, calcium oxide (CaO), calcium hydroxide (Ca(OH)$_2$), calcium carbonate (CaCO$_3$), magnesium hydroxide (MH(OH)$_2$), magnesium oxide (MgO), magnesium dioxide, magnesium carbonate (MgCO$_3$), titanium oxide, titanium dioxide, potassium titanate, barium sulfate, zirconium oxide (ZrO$_2$), zirconium hydroxide [Zr(OH)$_2$·nH$_2$O], zirconium carbonate [Zr(CO$_3$)$_2$], crystalline aluminosilicates, calcium silicates, starch, gypsum (calcium sulfate hydrate), fly ash, and combinations thereof; in certain such embodiments, the total amount of such extender(s) is no more than 55 phr, no more than 35 phr, 15-45 phr or 2-30 phr. Non-limiting examples of silica fillers suitable for use as an extender in certain embodiments of the first-fourth embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of first-fourth embodiments disclosed herein include, but are not limited to, aluminum silicate, magnesium silicate (Mg$_2$SiO$_4$, MgSiO$_3$ etc.), magnesium calcium silicate (CaMgSiO$_4$), calcium silicate (Ca$_2$SiO$_4$ etc.), aluminum silicate (Al$_2$SiO$_5$, Al$_4$·3SiO$_4$·5H$_2$O etc.), aluminum calcium silicate (Al$_2$O$_3$·CaO$_2$SiO$_2$, etc.), and the like. Among the listed silica fillers, precipitated amorphous wet-process, hydrated silica fillers are preferred. In certain embodiments of the first-fourth embodiments wherein the mixture that comprises the sealant layer includes one or more extenders, the extender comprises carbon black, clay, titanium dioxide, calcium carbonate, graphite, talc, or a combination thereof; in certain such embodiments, the total amount of such extender(s) is no more than 55 phr, no more than 35 phr, 15-45 phr or 2-30 phr.

In those embodiments of the first-fourth embodiments wherein it is desirable for the sealant layer to be black, the one or more extenders preferably includes carbon black (non-reinforcing, reinforcing, or a combination thereof), in one of the foregoing amounts. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Typical suitable reinforcing carbon black(s) for use in certain embodiments of the first-fourth embodiments disclosed herein are N-110, N-220, N-339, N-330, N-351, N-550, N-660, and N-700 series, all as designated by ASTM D-1765-82a. The carbon blacks utilized can be in pelletized form or an unpelletized flocculent mass. Preferably, for more uniform mixing, unpelletized carbon black is preferred. Non-reinforcing carbon black(s) can also be used as the one or more extenders, in a total amount equating to one of the foregoing amounts) be utilized. Non-limiting examples of non-reinforcing carbon blacks include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

In those embodiments of the first-fourth embodiments wherein it is desirable for the sealant layer to be non-black, the one or more extenders preferably includes talc, titanium dioxide, or calcium carbonate, in one of the foregoing amounts. The use of such extenders can be sufficient to render the sealant layer white in color. In other embodiments of the first-fourth embodiments wherein it is desirable for the sealant layer to be non-black but a non-white color is preferred, one or more of talc, titanium dioxide, or calcium carbonate (in one or more of the foregoing amounts) may be utilized in combination with one or more pigments to achieve a non-black, non-white color such as red, blue, orange, yellow, green, purple, or pink.

In certain embodiments of the first-fourth embodiments, the one or more extenders includes 1-10 phr (e.g., 1, 2, 3, 4, 5, 6, 7, 8, 9, or 10 phr), preferably 3-8 phr of fumed silica. The presence of fumed silica can advantageously increase the cold flow stability of the sealant layer which can result in reduced cold flow of the sealant layer at low shear (e.g., through an unplugged hole or puncture such as may be created when a nail is removed from the tire) at relatively low temperatures. The reduced cold flow of the sealant layer is exhibited by a reduced tendency for the sealant layer to flow out of the unplugged hole or puncture, as compared to a sealant layer having the same composition except for lacking the fumed silica. The presence of fumed silica can also advantageously maintain the high shear viscosity of the sealant composition at relatively low temperatures as well as performance at relatively higher temperatures. Various types of fumed silicas are commercially available and suitable for use in certain embodiments of the first-fourth embodiments. Non-limiting examples include fumed silicas available from Evonik Industries under the Aerosil® tradename as well as those available from Cabot under the Cab-O-Sil® tradename. In certain embodiments of the first-fourth embodiments, the fumed silica may be hydrophobic or hydrophilic, although hydrophobic fumed silicas are preferred. In certain embodiments of the first-fourth embodiments, the fumed silica has a BET surface area of 100-300 m$^2$/g (e.g., 100, 120, 140, 160, 180, 200, 220, 240, 260, 280, or 300 m$^2$/g), or 150-250 m$^2$/g (e.g., 150, 160, 170, 180, 190, 200, 210, 220, 230, 240, or 250 m$^2$/g and/or a pH of 3-9 (e.g., 3, 3.5, 4, 4.5, 5, 5.5, 6, 6.5, 7, 7.5, 8, 8.5, or 9) or 4-6 (e.g., 4, 4.5, 5, 5.5, or 6).

Hydroscopic Substance

As discussed above, according to the first-fourth embodiments, the mixture that comprises the sealant layer optionally includes at least one hydroscopic substance. As used herein, the term hydroscopic refers to a substance which is capable of adsorbing water in its various forms (e.g., moisture in the air). In certain embodiments of the first-fourth embodiments, the mixture that comprises the sealant layer includes at least one hydroscopic substance. In other embodiments of the first-fourth embodiments, the mixture that comprises the sealant layer lacks any (i.e., contains 0 phr) of any hydroscopic substance. In those embodiments of the first-fourth embodiments wherein the mixture that comprises the sealant layer includes at least one hydroscopic substance, the amount and identity of the hydroscopic substance(s) may vary. In certain embodiments of the first-fourth embodiments wherein the mixture that comprises the sealant layer includes at least one hydroscopic substance, the total amount of hydroscopic substance(s) is 0.5 to 20 phr (e.g., 0.5, 1, 2, 3, 4, 5, 6, 7, 8, 9, 10, 15, or 20 phr) or 0.5 to 10 phr (e.g., 0.5, 1, 2, 3, 4, 5, 6, 7, 8, 9, or 10 phr). In other embodiments of the first-fourth embodiments wherein the mixture that comprises the sealant layer includes at least one hydroscopic substance, the total amount of hydroscopic substance(s) is 1 to 5 phr (e.g., 1, 2, 3, 4, or 5 phr). In certain embodiments of the first-fourth embodiments, the mixture that comprises the sealant layer includes at least one hydroscopic substance selected from calcium oxide, anhydrous silica, anhydrous sodium sulfate, anhydrous calcium sulfate, zeolites, and combinations thereof; in certain such embodiments, the total amount of such hydroscopic substance(s) is 0.5 to 10 phr.

Cure Package

As discussed above, according to the first-fourth embodiments, the mixture that comprises the sealant layer includes a cure package. According to the first-fourth embodiments, the ingredients of the cure package may vary, but generally will include at least a vulcanizing agent such as sulfur and one or more vulcanization accelerators. In certain embodiments of the first-fourth embodiments, the cure package includes at least one vulcanizing agent and at least one vulcanizing accelerator, and optionally at least one of: at least one vulcanizing activator (e.g., zinc oxide, stearic acid, and the like), at least one vulcanizing inhibitor, at least one anti-scorching agent, or at least one crosslink initiator. Vulcanizing accelerators and vulcanizing activators act as catalysts for the vulcanization agent.

Examples of suitable types of vulcanizing agents for use in the mixture of ingredients that comprises the sealant layer according to the first-fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is insoluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, which is incorporated herein by reference. Vulcanizing agents can be used alone or in combination. Generally, according to certain embodiments of the first-fourth embodiments, the vulcanizing agents are used in an amount ranging from 0.1 to 10 phr, including from 0.5 to 7.5 phr, including from 0.5 to 5 phr, and preferably from 0.5 to 3.5 phr.

In certain embodiments of the first-fourth embodiments disclosed herein, the at least one vulcanization accelerator used in the cure package of the mixture that comprises the sealant layer is selected from at least one of the following classes of vulcanization accelerators: thiurams, thioureas, dithiocarbamates, xanthates, or thiophosphates. In certain embodiments of the first-fourth embodiments, the at least one vulcanization accelerator comprises a thiazole, optionally in combination with one of more vulcanization accelerators from one or more of the foregoing classes. Non-limiting examples of vulcanizing accelerators that belong to the class of thiurams include: TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide). Non-limiting examples of vulcanizing accelerators that belong to the class of thioureas include: ETU (ethylene thiourea), DPTU (N,N-diethyl thiourea), DETU (N,N-dibutylthiourea), and DBTU (diphenyl thiourea). Non-limiting examples of vulcanizing accelerators that belong to the class of dithiocarbamates include: ZDMC (zinc dimethyl dithiocarbamate), ZDEC (zinc diethyl dithiocarbamate), ZDBC (zinc dibutyl dithiocarbamate), ZEDC (zinc N-ethyl-dithiocarbamate), CDMC (copper dimethyl dithiocarbamate) and ZBEC (zinc dibenzyl dithiocarbamate). Non-limiting examples of vulcanizing accelerators that belong to the class of xanthates include: ZIX (zinc isopropyl xanthate). Non-limiting examples of vulcanizing accelerators that belong to the class of thiophosphates include: ZBDP (Zinc-O,O-di-N-phosphorodithioate). Non-limiting examples of vulcanizing accelerators that belong to the class of thiazoles include: MBT (2-mercaptobenzothiazole), MBTS (2,2-benzothiazole disulfide), ZMBT (zinc 2-mercaptobenzothiazole) and CMBT (copper 2-mercaptobenzothiazole). Additional examples of suitable vulcanizing accelerators for use in certain embodiments of the first-fourth embodiments disclosed herein include, but are not limited to: sulfenamides (e.g., N-cyclohexyl-2-benzothiazole-sulfenamide (CBS), N-tert-butyl-2-benzothiazole-sulfenamide (TBBS), and the like); guanidine vulcanization accelerators (e.g., diphenyl guanidine (DPG) and the like); and carbamate vulcanizing accelerators (e.g., zinc dibutyl dithiocarbamate (ZDBC), zinc dibenzyl dithiocarbamate (ZBEC), zinc diethyl dithiocarbamate (ZDEC), zinc dimethyl dithiocarbamate (ZDMC), zinc N-ethyl-dithiocarbamate (ZEDC), copper dimethyl diothiocarbmate (CDMC), and the like), and combinations thereof; such vulcanization accelerators can be used either alone, in combination, or in combination with one of the foregoing classes of vulcanization accelerators. Generally, according to certain embodiments of the first-fourth embodiments, the total amount of vulcanization accelerator (when used) ranges from 0.5 to 15 phr (e.g., 0.5, 1, 2, 3, 4, 5, 6, 7, 8, 9, 10, 11, 12, 13, 14, 15 phr), 0.5 to 10 phr, 1 to 5 phr, or 2 to 10 phr. In certain embodiments of the first-fourth embodiments, the vulcanizing agent (when present) is used in an amount ranging from 0.1 to 10 phr (e.g., 0.1, 0.5, 1, 2, 3, 4, 5, 6, 7, 8, 9, 10 phr), including from 0.1 to 7.5 phr, including from 0.1 to 5 phr, and preferably from 0.1 to 3.5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. In certain embodiments of the first-fourth embodiments wherein the mixture that comprises the sealant layer includes a cure package which comprises a vulcanizing activator, the amount of vulcanization activator used ranges from 0.1 to 10 phr (e.g., 0.1, 0.5, 1, 2, 3, 4, 5, 6, 7, 8, 9, or 10 phr), preferably 2 to 9 (e.g., 2, 2.5, 3, 3.5, 4, 4.5, 5, 5.5, 6, 6.5, 7, 7.5, 8, 8.5, or 9 phr) phr. In certain embodiments of the first-fourth embodiments, the mixture that comprises the sealant layer includes a cure package which comprises a vulcanizing activator selected from zinc oxide, stearic acid, palmitic acid, lauric acid, zinc salts of each of the foregoing acids, or a combination thereof; in certain such embodiments, the total amount of vulcanizing activator(s) is one of the foregoing amounts. In other embodiments of the first-fourth embodiments, the mixture that comprises the sealant layer includes a cure package that is devoid of any vulcanizing activators (i.e., contains 0 phr of vulcanizing activator).

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. In certain embodiments of the first-fourth embodiments, the mixture that comprises the sealant layer includes a cure package which comprises a vulcanization inhibitor in an amount of 0.1 to 3 phr, preferably 0.5 to 2 phr; in certain such embodiments, the vulcanization inhibitor is PVI. In other embodiments of the first-fourth embodiments, the mixture that comprises the sealant layer includes a cure package that is devoid of any vulcanization inhibitor (i.e., contains 0 phr of vulcanization inhibitor).

In certain embodiments of the first-fourth embodiments, the mixture that comprises the sealant layer includes at least one crosslink initiator, e.g., as part of the cure package. As used herein, the term crosslink initiator refers to a compound which enhances or initiates carbon-carbon crosslinking between polymer chains of the at least one rubber, in particular between polymer chains of halogenated butyl rubber. Thus, the crosslinker initiator can also be referred to as a carbon-carbon crosslink initiator. In certain embodiments of the first-fourth embodiments, the mixture that comprises the sealant layer includes 1 to 10 phr (e.g., 1, 2, 3, 4, 5, 6, 7, 8, 9 or 10 phr), preferably 2 to 7 phr of at least one crosslink initiator. Various compounds may be suitable for use as the crosslinker initiator, including, but not limited to azo compounds (e.g., azoisobutyronitrile (AIBN)), peroxides (e.g., di-tert-butyl peroxide, quinoline compounds, or nitrones (e.g., TEMPO). In certain embodiments of the first-fourth embodiments, the at least one crosslink initiator includes a quinoline compound, preferably selected from the group of hydrocarbyl-substituted quinolines. A quinoline compound can also be referred to as a quinoline-based crosslinking initiator and should be understood as including hydrocarbyl-substituted quinolines (as discussed infra) and polymerized forms thereof. Suitable hydrocarbyl-substituted quinolines include those with 1-3 hydrocarbyl groups (e.g., having $C_1$-$C_6$) bonded to the carbons that are alpha and gamma to the nitrogen of the quinoline; in certain embodiments, the hydrocarbyl-substituted quinoline is polymerized. In certain embodiments, the hydrocarbyl substitution upon the quinoline comprises alkyl (linear or branched) of $C_1$-$C_6$ (e.g., $C_1$, $C_2$, $C_3$, $C_4$, $C_5$, or $C_6$), preferably $C_1$-$C_2$. In other embodiments, the hydrocarbyl substitution upon the quinoline includes at least one aromatic group (e.g., -phenyl). In yet other embodiments, the hydrocarbyl substitution is a combination of alkyl and aromatic groups. Particular alkyl-substituted quinolines that may be utilized include, but are not limited to (1,2-dihydro-2,2,4-trimethylquinoline (TMQ) or a polymerized form thereof (poly(1,2-dihydro-2, 2,4-trimethylquinoline)). In certain embodiments of the first-fourth embodiments, a polymerized quinoline (preferably a polymerized alkyl-substituted quinoline such as poly (1,2-dihydro-2,2,4-trimethylquinoline)) is used which has a molecular weight of 500-2000 grams/mole (e.g., 500, 600, 700, 800, 900, 1000, 1100, 1200, 1300, 1400, or 1500 grams/mole), preferably 1000-1500 grams/mole. Without being bound by theory, it is believed that the crosslink initiator enhances carbon-carbon crosslinking by cleaving the halogen from the halogenated butyl rubber in one polymer chain, creating a polymer species capable of bonding by its free radical carbon to a unsaturated carbon in another polymer chain.

Additional Ingredients

In certain embodiments of the first-fourth embodiments, the mixture that comprises the sealant layer further comprises one or more additional ingredients (i.e., in addition to the at least one rubber, at least one tackifier, one or more extenders, at least one hydroscopic substance, and cure package ingredients as discussed above). In other embodiments of the first-fourth embodiments, the sealant layer is made from a mixture that consists of the at least one rubber, at least one tackifier, one or more extenders, at least one hydroscopic substance, and cure package ingredients (all as discussed above), and contains no other additional ingredients.

Exemplary additional ingredients that may be present in the mixture that comprises the sealant layer according to certain embodiments of the first-fourth embodiments include, but are not limited to, oils, waxes, antioxidants, and antiozonants. In certain embodiments of the first-fourth embodiments wherein the mixture that comprises the sealant layer includes one or more oils, the total amount of such oil(s) is 50-350 phr (e.g., 50 phr, 75 phr, 100 phr, 120 phr, 150 phr, 170 phr, 200 phr, 220 phr, 250 phr, 270 phr, 300 phr, 320 phr, 350 phr), or 100-300 phr. In other embodiments of the first-fourth embodiments the mixture that comprises the sealant layer includes a limited amount of oil, e.g., less than 100 phr (e.g., less than 90 phr, less than 80 phr, less than 70 phr, less than 60 phr, less than 50 phr, less than 40 phr, less than 30 phr, less than 20 phr, less than 10 phr, less than 5 phr) or even 0 phr. Limiting the amount of oil to one of the foregoing amounts (e.g., less than 100 phr) can be advantageous in limiting or avoiding migration of oil from the sealant layer into the other components of the tire.

Detackifier

In certain embodiments of the first-fourth embodiments, the sealant layer further comprises a detackifier coating on its upper surface (the radially inward facing surface when the sealant layer is adhered to an inner liner of a tire). A detackifier coating upon the upper surface of the sealant layer (the radially inward facing surface when the sealant layer is adhered to an inner liner of a tire) can be especially beneficial to avoiding sticking of non-desirable objects such as dirt or insects by reducing its tackiness or stickiness. According to the first-fourth embodiments, a detackifier coating upon the upper surface of the sealant layer (i.e., the radially inward facing surface when the sealant layer is adhered to an inner line of a tire) may be especially useful in those embodiments wherein the sealant layer is adhered to the radially inward facing surface of the inner liner since in certain such embodiments, the upper surface of the sealant layer may be (in certain embodiments) the radially innermost component/surface within the tire. In certain embodiments of the first-fourth embodiments wherein the sealant layer is adhered to the radially outward facing surface of the inner liner, the sealant layer has no detackifier coating upon its upper surface. In certain embodiments of the first-fourth embodiments, the detackifier coating can be described as a coating resulting from drying of a polymer-containing solution (e.g., polymer+water); in certain such embodiments, the polymer of the detackifier coating comprises a vinyl polymer (e.g., poly(vinyl pyrrolidinone) or PVP, poly(vinyl alcohol) or PVA), ethyl(vinyl alcohol) or EVA, polytetrafluoroethylene or PTFE, or a combination thereof), a polymer formed by reaction of poly(carboxylic acids) with polyols (e.g., polyethylene terephthalate or PET, polycaprolactone, poly(lactic acid) or PLA, poly(lactic-co-glycolic acid) or PLGA, or a combination thereof), a polyether (e.g., polyethylene glycol or PEG, or polypropylene glycol or PPG, or a combination thereof), a polyurea, a polyurethane, a polyamide elastomer, a polymer latex (containing e.g., water-based polyurethane), or a combination thereof. In other embodiments of the first-fourth embodiments, the detackifier coating is a thermoplastic film such as can be applied as a dry film to the upper surface of the sealant layer; in certain such embodiments the thermoplastic film comprises at least one polymer selected from: polyolefins (e.g., low density polyethylene or LDPE); a vinyl chloride polymers (e.g., polyvinyl chloride or PVC, polyvinylidene chloride or PVDC, or a combination thereof); a polyesters; polyamides; polycarbonates; polyurethanes; epoxies; polyacetals; or a combination thereof.

Removable Backing/Liner

In certain embodiments of the first embodiment, the sealant layer further comprises a removable backing upon its lower surface. The removable backing is removed prior to adhering the sealant layer to the radially inward facing surface of the inner liner or prior to adhering the sealant layer to the radially outward facing surface of the inner liner. By stating that the backing is removable it is intended to convey that the backing can be removed from the sealant layer by a non-destructive means such as by peeling away of the removable backing. The removable backing can beneficially cover the tacky lower surface of the sealant layer allowing for improved storage, shipping and handling. In certain embodiments of the first embodiment wherein the sealant layer includes a removable backing upon its lower surface, the sealant layer is rolled for storage and shipping; in such embodiments, the sealant layer is unrolled and the removable backing is removed prior to adhering the sealant layer to a tire inner liner.

In certain embodiments of the first embodiment, the removable backing comprises paper, plastic or metal foil coated with a non-stick coating upon the side contacting the sealant layer; exemplary non-stick coatings include gelatin, silicone, wax, and polymers such as PTFE or PET (partially biaxially oriented polyethylene terephthalate). In certain embodiments of the first embodiment, the removable backing is used in manufacturing of the sealant layer and allows for extrusion of the mixture of ingredients directly onto the removable backing.

Barrier Layer

In certain embodiments of the first-fourth embodiments, the sealant layer further comprises a barrier layer upon its lower surface (its radially outward facing surface). Such a barrier layer will generally comprise a relatively thin layer of metal or polymeric film separating the tackifier-containing sealant layer from the inner liner and other components of the tire and can be advantageous in limiting or avoiding unwanted migration of ingredients such as tackifier or plasticizer into the inner liner or into other tire components. In certain embodiments of the first-fourth embodiments wherein the sealant layer further comprises a barrier layer upon its lower surface (its radially inward facing surface), the barrier layer has a thickness of 0.01 to 0.3 mm, preferably 0.05 to 0.2 mm. In certain embodiments of the first-fourth embodiments wherein the sealant layer further comprises a barrier layer upon its lower surface (its radially outward facing surface), the barrier layer includes adhesive upon at least its surface which faces the sealant layer.

Curing of the Sealant Layer

In certain embodiments of the first-fourth embodiments, the sealant layer is cured. By cured is meant that the mixture of ingredients comprising the sealant layer has been subjected to heating or other treatment to cross-link the polymer chains, thereby toughening or otherwise improving the properties of the mixture. Preferably, when the sealant layer is cured, such curing takes place prior to adhering the sealant layer to the inner liner of a tire. However, in other embodiments, the sealant layer may be cured along with the other components of the tire (e.g., in a tire mold). In certain embodiments of the first-fourth embodiments, the entire sealant layer is cured. In other embodiments of the first-fourth embodiments, less than the entire sealant layer is cured (e.g., the upper surface or radially inward facing surface of the sealant layer is cured and the remainder is uncured). By remainder is meant the lower surface or radially outward facing surface of the sealant layer as well as the portion between the upper and lower surface. In those embodiments of the first-fourth embodiments wherein less than the entire sealant layer is cured, such curing can be achieved by various methods such as exposing only one surface of the sealant layer to heat or other curing treatment or by producing the sealant layer from two or more sub-layers with at least one of the sub-layers being cured and at least one other sub-layer being uncured.

When heat is used to effect curing of the sealant layer, the time and temperature used may vary. In certain embodiments of the first-fourth embodiments, the sealant layer is cured by heating to a temperature of about 40 to about 90° C. (e.g., 40, 45, 50, 55, 60, 65, 70, 75, 80, 85, 90° C.), preferably about 50 to about 70° C.; in certain such embodiments, the heating takes place for a period of about 6 to about 24 hours (e.g., 6, 8, 10, 12, 14, 16, 18, 20, 22, 24 hours). In other embodiments of the first-fourth embodiments, the sealant layer is cured by heating to a relatively higher temperature for a relatively shorter period of time such as to a temperature of about 100 to about 150° C. (e.g., 100, 110, 120, 130, 140, 150° C.); in certain such embodiments the heating takes places for a period of about 20 minutes to about 2 hours (e.g., 20 minutes, 30 minutes, 40 minutes, 50 minutes, 1 hour, 1.25 hours, 1.5 hours, 1.75 hours, 2 hour) or about 30 minutes to about 1 hour.

Properties of the Sealant Layer and/or Mixture Thereof

In certain embodiments of the first-fourth embodiments, at least one of the following is met: (a) the mixture of the sealant layer has an elongation at break of 400 to 1200% (e.g., 500%, 600%, 700%, 800%, 900%, 1000%, 1100%, 1200), preferably 600-1000% (e.g., 600%, 650%, 700%, 750%, 800%, 850%, 900%, 950%, 1000%, 1050%, 1100%); (b) the mixture of the sealant layer has a tensile strength at break of 0.01 to 5 MPa (e.g., 0.01, 0.05, 0.1, 0.5, 1, 1.5, 2, 2.5, 3, 3.5, 4, 4.5, 5 MPa), preferably 0.1-2 MPa (e.g., 0.1, 0.5, 1, 1.5, 2 MPa); or (c) the sealant layer is adhered to the radially inward facing surface of the inner liner or to the radially outward facing surface of the inner liner with a peel strength of 2 to 20 N/cm (e.g., 2, 5, 7, 10, 12, 15, 17, or 20 N/cm) or 4 to 16 N/cm (e.g., 4, 5, 7, 10, 12, 15, or 16 N/cm), at 23° C. Measurements of elongation at break and tensile strength can be made upon samples of a mixture containing the same ingredients (e.g., at least one rubber, at least one tackifier, optionally one or more extenders, optionally at least one hydroscopic substance, and a cure package) and made according to the same general procedure (e.g., mixing, curing, etc.) as the rubber-containing mixture portion of the sealant layer in question. Generally, ASTM-D412(1998) Method B, can be used to determine elongation at break and tensile strength at 25° C. More specifically, following ASTM D-412, dumbbell-shaped samples with a cross-section dimension of 4 mm in width and 1.9 mm in thickness at the center, cured for 15 minutes at 170° C. can be utilized. Peel strength can be determined as described in more detail below.

Adhering Sealant Layer to Inner Liner

As discussed above, according to the process of the first embodiment, the sealant layer is adhered either to the radially inward facing surface of the inner liner so that the lower surface of the sealant layer faces radially outward to produce a tire containing sealant (i.e., the sealant layer) or to the radially outward facing surface of the tire inner liner so that the lower surface of the sealant layer faces radially outward when the sealant layer-inner liner combination is present in a tire. As also discussed above, according to the second embodiment, the tire contains a sealant layer wherein the sealant layer is adhered either to the radially inward facing surface of the inner liner so that the lower surface of the sealant layer faces radially outward or to the radially outward facing surface of the inner liner so that the lower surface of the sealant layer faces radially outward. In certain embodiments of the first-fourth embodiments, the lower surface of the sealant layer is directly adhered to either the radially inward facing surface or the radially outward facing surface of the inner liner. In other embodiments of the first-fourth embodiments (e.g., when the lower surface of the sealant layer further comprises a barrier layer or an adhesive) the sealant layer may still be described as being adhered to the inner liner even though it is the barrier layer upon the lower surface of the sealant layer (which, as discussed herein, can be considered to be a part of the sealant layer) or the adhesive upon the lower surface of the sealant layer which directly contacts the inner liner.

By stating that the sealant layer is adhered to the radially inward facing surface of the inner liner or to the radially outward facing surface of the inner liner is meant that the sealant layer is securely attached to the inner liner so as to avoid movement of the sealant layer relative to the inner liner. It is also advantageous for the sealant layer to be adhered sufficiently to avoid displacement of the sealant layer during operation of the tire. In certain embodiments of the first-fourth embodiments, the sealant layer is adhered to the radially inward facing surface of the inner liner or to the radially outward facing surface of the inner liner with sufficient adhesion to exhibit a peel strength of about 2 to about 20 N/cm (e.g., 2, 5, 7, 10, 12, 15, 17, or 20 N/cm) or 2 to 20 N/cm, at 23° C.; in certain such embodiments, the peel strength is about or 4 to 16 N/cm (e.g., 4, 5, 7, 10, 12, 15, or 16 N/cm) or 4-16 N/cm, at 23° C. Peel strength measurements can be made according to ASTM Procedure D903 and/or according to ASTM Procedure D1876 and utilizing a sample containing a sealant layer adhered to an inner liner surface. The sample may be cut from an assembled sealant layer-inner liner combination or may be prepared especially for testing (using the same ingredients as the sealant layer-inner liner combination in question and the same process for assembling same).

In those embodiments of the first-fourth embodiments, where an adhesive is utilized, the adhesive(s)s used in adhering the sealant layer to the inner layer and/or to the remainder of the tire may cover the entire surface(s) of the contacting surfaces or may cover less than the entire surface(s) of the contacting surfaces. By stating that less than the entire surface(s) of the contacting surfaces are covered with adhesive(s) is meant that the adhesive may be applied in various non-continuous patterns such as dots or strips. In certain embodiments of the first-fourth embodiments, one or more of the lower surface of the sealant layer, the outer surface of the barrier layer, the radially inner surface of the inner liner, the radially outer surface of the inner liner, the upper surface of the sealant layer, or a combination thereof may contain a continuously applied adhesive. In other embodiments of the first-fourth embodiments, one or more of the lower surface of the sealant layer, the outer surface of the barrier layer, the radially inner surface of the inner liner, the radially outer surface of the inner liner, the upper surface of the sealant layer, or a combination thereof may contain a non-continuously applied adhesive.

In certain embodiments of the first-fourth embodiments, the sealant layer is adhered to the inner layer of the tire by one or more adhesives; in certain such embodiments, the adhesive comprises a pressure-sensitive adhesive. In other embodiments of the first-fourth embodiments, the sealant layer is adhered to the inner layer of the tire without the need for any separate adhesive. In certain embodiments of the first embodiment, adhering of the lower surface of the sealant layer to the radially inward facing surface of the inner liner or to the radially outward facing surface of the inner liner includes application of an adhesive to at least one of the lower surface of the sealant layer, the radially inward facing surface of the inner liner, or the radially outward facing surface of the inner liner. In certain embodiments of the first-fourth embodiments, the sealant layer that is provided includes an adhesive on its lower surface. In certain embodiments of the first-fourth embodiments, the sealant layer that is provided includes an adhesive on its upper surface (which can aid in adhering to the inner liner in those embodiments wherein the sealant layer is adhered to the radially outward facing surface of the inner liner; in certain such embodiments, an adhesive will also be present between the lower surface of the sealant layer and the remaining portion of the tire. In certain embodiments of the first-fourth embodiments, the radially inward facing surface of the inner liner includes an adhesive on its lower surface. In certain embodiments of the first-fourth embodiments, the radially outward facing surface of the inner liner includes an adhesive on its lower surface. In certain embodiments of the first-fourth embodiments, both the lower surface of the sealant layer and the radially inward facing surface of the inner liner include adhesive. In certain embodiments of the first-fourth embodiments, both the lower surface of the sealant layer and the radially outward facing surface of the inner liner include adhesive. In other embodiments of the first-fourth embodiments, the lower surface of the sealant layer is sufficiently tacky to adhere to the inner liner such that no separate adhesive is required. In certain embodiments of the first-fourth embodiments, wherein an adhesive is used to adhere the lower surface (which becomes radially outward facing) of the sealant layer to the radially inward facing surface of the inner liner or the upper surface of the sealant layer (which becomes radially inward facing) to the radially outward facing surface of the inner liner, the adhesive comprises at least one of the following: (1) rubber (e.g., natural rubber, butyl rubber, halobutyl rubber, polybutadiene rubber, styrene-butadiene rubber, or a combination thereof), (2) acrylic polymer (e.g., an acrylate made by copolymerizing one or more acrylic ester with one or more other monomers or one of those discussed above), (3) silicone rubber, (4) polyether adhesive, (5) polyurethane polymer; in certain such embodiments, the separate adhesive is a PSA. In certain embodiments of the first-fourth embodiments, the adhesive used to adhere the sealant layer to the inner liner is a water-based adhesive. According to the first-fourth embodiments, in certain embodiments one or more of the foregoing adhesives may be utilized in adhering the lower surface of the sealant layer to the remainder of the tire (e.g., body ply).

In certain embodiments of the first embodiment, adhering of the sealant layer to the inner liner is achieved by extruding the sealant layer directly onto the radially inward facing surface of the inner liner or directly upon the radially outward facing surface of the inner liner. Generally, according to such embodiments, the mixture comprising the sealant layer will be at an elevated temperature (e.g., greater than about 90° C.) during such extrusion.

In certain embodiments of the first-fourth embodiments, the tire inner liner to which the sealant layer is adhered comprises (includes) a polysiloxane-containing release upon its radially inward facing surface. (Generally, in those embodiments of the first-fourth embodiments wherein the sealant layer is adhered to the radially outward facing surface of the tire inner liner no polysiloxane-containing release will be present upon the radially outward facing surface of the inner liner.) Such a polysiloxane-containing release may represent the residue from a release treatment applied to the inner liner surface prior to curing and designed to avoid sticking or co-curing of the inner liner to a bladder during curing. In certain of those embodiments of the first-fourth embodiments wherein the radially inward facing surface of the tire inner liner includes a polysiloxane-containing release, treatment of the radially inward facing surface of the inner liner to create an adhesion surface thereon may be necessary in order to adhere the sealant layer; in certain such embodiments, the treatment of the radially inward facing surface of the inner liner includes application of a rubber-containing liquid comprising at least one conjugated diene monomer-containing rubber, polyurethane, and at least one solvent and in other embodiments, the treatment of the radially inward facing surface of the inner liner includes application of a rubber-containing liquid comprising at least one conjugated diene monomer-containing rubber and at least one solvent. In certain embodiments of the first-fourth embodiments, the rubber-containing liquid meets at least one of the following: (a) the at least one conjugated monomer-containing rubber is present in 100 parts and is selected from butyl rubber, halogenated butyl rubber, polybutadiene, natural rubber, polyisoprene, chlorinated polyisoprene, and combinations thereof; (b) the at least one conjugated monomer-containing rubber is present in 100 parts and is selected from butyl rubber, halogenated butyl rubber, or a combination thereof; (c) the polyurethane is present in an amount of 10-50 phr (based upon 100 parts of the at least one conjugated monomer-containing rubber); (d) the solvent comprises a majority by weight of at least one hydrocarbon solvent; or (e) the solvent comprises a majority by weight of at least one halogenated aromatic hydrocarbon solvent, at least one halogenated C1-C6 alkane, at least one halogenated C2-C6 alkene, or a combination thereof. In other embodiments of the first-fourth embodiments, the rubber-containing liquid meets at least one of the following: (a) the rubber-containing liquid comprises about 10 to about 45% by weight (e.g., 10, 15, 20, 25, 30, 35, 40, 45%) of conjugated diene monomer containing rubber (based upon the total weight of the rubber-containing liquid); (b) the rubber of the rubber-containing liquid comprises at least one of butyl rubber, halogenated butyl rubber, natural rubber, polyisoprene, polybutadiene rubber, styrene-butadiene rubber, styrene-butadiene-isoprene rubber, isoprene-butadiene rubber, polychloroprene rubber, EPDM, or nitrile rubber; (c) at least 80% by weight of the rubber in the rubber-containing liquid comprises a combination of butyl rubber, halogenated butyl rubber, and EPDM rubber; or (d) a majority by weight of the solvent present in the rubber-containing liquid comprises water; comprises at least one hydrocarbon solvent; or comprises one or more halogenated solvents. Further details concerning the composition of the rubber-containing liquid can be found in application Ser. No. 62/357,009 (filed Jun. 30, 2016) or application Ser. No. 62/355,568 (filed Jun. 28, 2016) which are hereby incorporated by reference in their entirety. According to certain embodiments of the first-fourth embodiments, once treated to form an adhesion surface, the treated polysiloxane-containing radially inward facing surface of the inner liner is adhered to the sealant layer (e.g., by using an adhesive or in other embodiments without the need for any separate adhesive due to the tackiness of the sealant layer).

In yet other embodiments of the first-fourth embodiments, the treatment of the radially inward facing surface of the inner liner includes application of a coating composition comprising: (a) a silyl-terminated polymer, (b) optionally at least one plasticizer, (c) at least one tackifier (d) at least one adhesion promoter, (e) optionally at least one moisture scavenger, (f) at least one catalyst, and (g) optionally at least one antioxidant to produce a polymer-containing coating upon the radially inward facing surface of the inner liner, thereby creating a polymer-containing coating upon the treated surface of the cured inner liner. Such a coating composition may be useful in embodiments of the first-fourth embodiments wherein the radially inward facing surface of the inner liner (includes) a polysiloxane-containing release as well as in those embodiments wherein the radially inward facing surface of the inner liner is substantially free of polysiloxane-containing release. In certain embodiments of the first-fourth embodiments, the coating composition meets at least one of the following: (a) the silyl-terminated polymer is present in an amount of about 25 to about 75% (e.g., 5%, 10%, 15%, 20%, 25%, 30%, 35%, 40%, 45%, 50%, 55%, 60%, 65%, 70%, or 75%) by weight (based upon the total weight of the composition used to treat the lower surface of the inner liner) and comprises a silyl-terminated polyether, a silyl-terminated polyurethane, a silyl-terminated polycarbonate, a silyl-terminated polyisobutylene, or a combination thereof; (b) the plasticizer is present in an amount of about 5 to about 40% (e.g., 5%, 10%, 15%, 20%, 25%, 30%, 35%, or 40%) by weight (based upon the total weight of the composition used to treat the lower surface of the inner liner) and comprises a phthalate, a dibenzoate, a fatty acid alkyl ester, epoxidized plant oil, or a combination thereof; (c) the tackifier is present in an amount of about 5 to about 25% (e.g., 5%, 7%, 10%, 12%, 15%, 17%, 20%, 22%, or 25% by weight) by weight (based upon the total weight of the composition used to treat the lower surface of the inner liner) and comprises a hydrocarbon resin, a low molecular weight polymer or oligomer, or a combination thereof; (d) the at least one adhesion promoter is present in an amount of about 1 to about 10% (e.g., 1%, 2%, 3%, 4%, 5%, 6%, 7%, 8%, 9%, or 10%) by weight (based upon the total weight of the composition used to treat the lower surface of the inner liner) and comprises a bi-functional silane; (e) the at least one moisture scavenger is present in an amount of about 0.5 to about 5% (e.g., 0.5%, 1%, 1.5%, 2%, 2.5%, 3%, 3.5%, 4%, 4.5%, or 5%) by weight (based upon the total weight of the composition used to treat the lower surface of the inner liner) and comprises a vinyl alkoxysilane, an alkyltrialkoxysilane, an oxazolidine, calcium oxide, anhydrous silica, anhydrous sodium sulfate, anhydrous calcium sulfate, a zeolites, or a combination thereof; (f) the at least one catalyst is present in an amount of about 0.1 to about 5% (e.g., 0.1%, 0.5%, 1%, 1.5%, 2%, 2.5%, 3%, 3.5%, 4%, 4.5%, or 5%) by weight (based upon the total weight of the composition used to treat the lower surface of the inner liner) and comprises at least one basic compound selected from alkali metal hydroxides, silanolates, organic amines, alkali metal carbonates, alkali metal bicarbonates, and combinations thereof or from at least one acidic compound selected from sulfuric acid, phosphoric acid, hydrochloric acid, organic acids, Lewis acids, metal halides, organotin compounds, titanium compounds, and combinations thereof; or (g) the at least one antioxidant (when present) is present in an amount of about 0.1 to about 3% (e.g., 0.1%, 0.5%, 1%, 1.5%, 2%, 2.5%, or 3%) by weight (based upon the total weight of the composition used to treat the lower surface of the inner liner) and comprises a hindered phenol, a hindered amine, a catechol, a phosphate ester, or a combination thereof. Further details concerning the composition of the coating composition can be found in application Ser. No. 62/434,591 (filed Dec. 15, 2016) which is hereby incorporated by reference in their entirety.

In certain embodiments of the first-fourth embodiments, the tire inner liner to which the sealant layer is adhered is substantially free of polysiloxane-containing release upon its radially inward facing surface. By substantially free of polysiloxane moieties is meant that the radially inward facing surface of the inner liner comprises less than 1% by weight, less than 0.5% by weight, less than 0.1% by weight, or even 0% by weight polysiloxane moieties. In those embodiments of the first-fourth embodiments wherein the radially inward facing surface of the inner liner is substantially free of polysiloxane-containing release, the sealant layer may be adhered to the inner liner without the need for any treatment of the radially inward facing surface of the inner liner; in certain such embodiments, the sealant layer is adhered to the radially inward facing surface of the inner liner using an adhesive. In certain embodiments of the first-fourth embodiments wherein the tire inner liner is substantially free of polysiloxane-containing release upon its radially inward facing surface, a rubber containing liquid is used to treat the radially inward facing surface of the inner liner prior to adhering the sealant layer, creating an adhesive layer upon the surface of the inner liner; preferably, such a rubber containing liquid meets at least one of the following: (a) the at least one conjugated monomer-containing rubber is present in 100 parts and is selected from butyl rubber, halogenated butyl rubber, polybutadiene, natural rubber, polyisoprene, chlorinated polyisoprene, and combinations thereof; (b) the at least one conjugated monomer-containing rubber is present in 100 parts and is selected from butyl rubber, halogenated butyl rubber, or a combination thereof; (c) the polyurethane is present in an amount of 10-50 phr (based upon 100 parts of the at least one conjugated monomer-containing rubber); (d) the solvent comprises a majority by weight of at least one hydrocarbon solvent; or (e) the solvent comprises a majority by weight of at least one halogenated aromatic hydrocarbon solvent, at least one halogenated C1-C6 alkane, at least one halogenated C2-C6 alkene, or a combination thereof.

In certain embodiments of the fourth embodiment, the tire that is provided comprises a punctured tire in need of repair. In such an embodiment, it is contemplated that the sealant layer could be added to a punctured tire during the process of repairing the tire, thereby resulting in a tire containing sealant (i.e., the sealant layer) even though the tire when punctured lacked any sealant. In certain embodiments of the second-fourth embodiments, it is contemplated that the sealant layer is adhered to the inner liner by the tire manufacturer as part of the manufacturing process such that a tire containing sealant (i.e., the sealant layer) is installed upon a vehicle as part of the vehicle's original equipment or utilized as a replacement tire upon a vehicle. In yet other embodiments of the second-fourth embodiments, it is contemplated that the sealant layer is adhered to the inner liner of a new replacement tire by an entity other than the tire manufacturer (e.g., by the tire installer) prior to installation of the replacement tire onto a vehicle.

Inner Liner

As discussed above, according to the first-fourth embodiments, the sealant layer is adhered to the inner liner of the tire. More specifically, the sealant layer is adhered either to the radially inward facing surface of the inner liner so that the lower surface of the sealant layer faces radially outward or to the radially outward facing surface of the inner liner so that the lower surface of the sealant layer faces radially outward. As used herein, the term inner liner should be understood to encompass both traditional-type inner liners (e.g., comprising a layer of butyl or halogenated butyl rubber), spray-on inner liners (e.g., comprising a composition which is sprayed or coated onto the radially inner surface of the tire to produce gas barrier properties without any separate butyl rubber-containing layer), and combinations thereof (e.g., a butyl rubber-containing layer with an air barrier sprayed upon). Additionally, as discussed further herein, it should be understood that in certain embodiments of the first-fourth embodiments, the tire inner liner to which the sealant layer is adhered may (at the point in time of the adhering of the sealant layer to the inner liner) be a component in a tire which also contains one or more belts and a tread; generally, in such embodiments, the tire will have already been cured when the sealant layer is adhered to the radially inward facing surface of the inner liner. In other embodiments of the first-fourth embodiments, the tire inner liner to which the sealant layer is adhered may not yet (at the point in time of adhering of the sealant layer to the inner liner) be a component in a tire which already includes one or more belts and a tread; generally, in such embodiments, the tire will be in the process of being built (e.g., the one or more belts and the tread will be added after the sealant layer is adhered to the inner liner) and the tire will be cured after the sealant layer is adhered to the inner liner. Embodiments wherein the tire inner liner to which the sealant layer is adhered are not yet a component in a tire which already includes one or more belts and a tread may be referred to (e.g., when incorporated into a tire) as containing a built-in sealant layer.

Tire

As discussed above, according certain embodiments of the process of the first embodiment, the sealant layer is adhered to the radially inward facing surface of the inner liner to produce a sealant layer-tire inner liner combination and in other embodiments the sealant layer is adhered to the radially outward facing surface of the inner liner to produce a sealant layer-tire inner liner combination. Generally, according to the first embodiment, the tire inner liner that is provided may be in various stages of manufacture but will generally include a radially inward facing surface. (The inner liner can also be described as including a radially outward facing surface.) A tire that incorporates a sealant layer-inner liner combination produced according to the first embodiment will include in its finished version (in addition to the inner liner and the sealant layer) one or more belts and a tread, and, thus, as part of the overall process of the first embodiment, one or more belts and a tread will generally be provided. In certain embodiments of the first embodiment, the sealant layer is adhered to the radially inward facing surface of a tire inner liner that has already been assembled with one or more belts and a tread; such a tire inner liner has preferably been cured prior to having the sealant layer adhered to the radially inward facing surface of its inner liner. In other embodiments of the first embodiment, the sealant layer is adhered to the radially outward facing surface of a tire inner liner prior to the inner liner being assembled with one or more belts or a tread; in such embodiments, the addition of the one or more belts, and the tread as well as the overall curing of the tire takes place after the sealant layer-tire inner liner combination is produced. Similarly, in certain embodiments of the second-fourth embodiments, the sealant layer is adhered to the outward facing surface of the tire inner liner and other components of the tire including the one or more belts and the tread are radially outward of the sealant layer; in certain such embodiments, the lower surface of the sealant layer is adhered to a body ply of the tire.

Process of Recovering Used Tire Components

According to the third embodiment, a process is provided for recovering one or more components of a used tire. The recovery may be for purposes of recycling the materials of one or more components of the used tire. A tire containing a sealant layer according to the second embodiment may be particularly suitable for recovering one or more components of the used tire in that the sealant layer may be removed from the tire by separating of the sealant layer from the inner liner. In certain embodiments of the third embodiment, the inner liner of the used tire has a radially inward facing surface which comprises (includes) a polysiloxane-containing release which prior to adhering of the sealant layer had been treated (e.g., with a rubber-containing liquid comprising at least one conjugated diene monomer-containing rubber, polyurethane and at least one solvent) to create an adhesion surface thereon. An inner liner which includes such a treated polysiloxane-containing release may allow for easier and more complete removal of the adhered sealant layer from the used tire. The presence of sealant or a sealant layer within a tire may inhibit the ability to recover or recycle components of the tire due to its stickiness which can lead to clogging of recycling equipment (e.g., shredder).

Process for Repairing a Punctured Tire

According to the fourth embodiment disclosed herein, a process for repairing a punctured tire is provided. The process comprises: providing a tire containing a sealant layer according to the second embodiment, wherein the tire contains at least one puncture of its inner liner; identifying the at least one puncture; repairing the puncture either by (a) removing the portion of the sealant layer surrounding the puncture, thereby creating a gap in the sealant layer; and adhering a new portion of sealant to the gap, or (b) adding a new portion of sealant to the puncture; thereby repairing the punctured tire. In certain embodiments of the fourth embodiment, the new portion of sealant that is provided comprises a sealant layer as described herein for the first, second and third embodiments. In those embodiments of the fourth embodiment where repairing the puncture comprises (a), the new portion of sealant preferably comprises a sealant layer as described herein for the first, second and third embodiments. In other embodiments of the fourth embodiment, the new portion of sealant that is provided comprises any sealant material capable of sealing the puncture. In certain such embodiments, the portion of the sealant layer surrounding the puncture includes at least 2.5 to 5 cm (e.g., 2.5, 3, 3.5, 4, 4.5, 5 cm) surrounding the puncture (or punctures); in such embodiments the portion removed may be square, rectangular, triangular, circular or oval in shape. In certain embodiments, the portion of the sealant layer that is removed may include the entire thickness of that portion (e.g., from the radially innermost surface of the sealant layer portion through the opposing surface of the sealant layer portion (lower surface) which faces radially outward and is adhered to the inner liner. In other embodiments, the portion of the sealant layer that is removed may include less than the entire thickness of that portion (e.g., from the radially innermost surface of the sealant layer portion but not through the opposing surface of the sealant layer portion. The portion of sealant layer that is used to repair the gap can be understood as having the structure and composition of the sealant layer described herein for use in the process of the first embodiment.

In certain embodiments of the fourth embodiment, the process is modified so that more than just the portion of the sealant layer surrounding the puncture is removed. In such embodiments, either the entire sealant layer is removed and a new sealant layer is added or a portion of the sealant layer including the puncture but also comprising the entire width of the sealant layer (e.g., belt-edge-to-belt-edge) and having a radial length at least 2.5 to 5 cm (e.g., 2.5, 3, 3.5, 4, 4.5, 5 cm) beyond each side of the puncture is removed; in certain such embodiments, the portion of the sealant layer removed may be square, rectangular or trapezoidal in shape.

In certain embodiments of the fourth embodiment, the removal of at least a portion of the sealant layer corresponding to the puncture is facilitated by use of a heated blade or other heated tool. In other embodiments of the fourth embodiment, the removal of at least a portion of the sealant layer corresponding to the puncture is facilitated by the use of laser-guided cutting. In such embodiments, during removal of the at least a portion of the sealant layer corresponding to the puncture, care must be taken to avoid puncture or tearing of the inner liner and it may be preferable to remove less than the entire thickness of the portion that is removed.

In certain embodiments of the fourth embodiment, identification of the at least one puncture may be facilitated if the sealant layer of the tire is non-black in color (e.g., white or a non-white color such as red, blue, orange, yellow, green, purple, or pink).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and embodiments described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As well, all numerical limitations and ranges that are preceded by the word "about" should be understood to include the particular number or range without the about as if fully set forth herein.

What is claimed is:

1. A tire containing a sealant layer comprising
one or more belts, a road-contacting tread, an inner liner with a radially inward facing surface and a radially outward facing surface, and a sealant layer having an upper surface, a lower surface, and a thickness of 2-8 mm,
wherein the sealant layer is adhered to either to the radially inward facing surface of the inner liner so that the lower surface of the sealant layer faces radially outward or to the radially outward facing surface of the inner liner so that the lower surface of the sealant layer faces radially outward,
wherein the sealant layer comprises a mixture of
  i. 100 parts of rubber selected from the group consisting of butyl rubber, halogenated butyl rubber, and combinations thereof;
  ii. 300-450 phr of at least one tackifier comprising of a low molecular weight polymer or oligomer having a Mw of 700-150,000 grams/mole and a Mn of 500-100,000 grams/mole in combination with at least one resin selected from the group consisting of phenolic resins, aliphatic resins, cycloaliphatic resins, aromatic resins, terpene resins, guayule resins, and combinations thereof wherein the resin is present in an amount of 5 to 20% by weight of the tackifer;
  iii. one or more extenders in a total amount of 10 to 35 wherein the one or more extenders is selected from the group consisting of carbon black, silica, clay, titanium dioxide, calcium carbonate, graphite, talc, or a combination thereof, wherein carbon black is present in an amount of 20 to 30 phr;
  iv. a cure package including a vulcanizing agent limited to a sulfur-based compound and wherein the cure package excludes any peroxide or quinoline compounds, wherein the mixture of the sealant layer contains less than 10 phr of any block copolymer and has an elongation at break of 400-1200% at 25° C.

2. The tire of claim 1, wherein the mixture of the sealant layer further comprises at least one hydroscopic substance in an amount of 0.5 to 10 phr.

3. The tire of claim 1, wherein up to 200 parts of the at least one tackifier are polybutene.

4. The tire of claim 3 wherein the polybutene has a Mn of 500-5000 grams/mole.

5. The tire of claim 1, wherein the low molecular weight polymer or oligomer comprises polyisoprene having a Mw of 15,000 to 100,000 grams/mole.

6. The tire of claim 1, wherein the low molecular weight polymer or oligomer comprises styrene-butadiene rubber having a Mw of 5,000 to 70,000 grams/mole.

7. The tire of claim 1, wherein the low molecular weight polymer or oligomer comprises polybutadiene rubber having a Mw of 5,000 to 70,000 grams/mole.

8. The tire of claim 7, wherein the polybutadiene rubber is a polar-functionalized polybutadiene having a Mn of 1200 to 10000 grams/mole.

9. The tire of claim 8, wherein the polar-functionalized polybutadiene is maleic anhydride functionalized.

10. The tire of claim 1, wherein the extender includes 1-10 phr of fumed silica.

11. The tire of claim 1, wherein up to 200 parts of the at least one tackifier are polybutene having a Mn of of 1200 to 10000 grams/mole.

12. The tire of claim 1, wherein the low molecular weight polymer or oligomer comprises polyisobutylene has a Mn of 20,000 to 100,000 grams/mole.

13. The tire of claim 1, wherein the low molecular weight polymer or oligomer comprises liquid EPDM having a viscosity of 50,000 to 150,000 centipoise as measured by Brookfield viscosity at 100° C.

14. The tire of claim 1, wherein the low molecular weight polymer or oligomer is selected from the group consisting of polyisoprene having a Mw of 15,000 to 100,000 grams/mole, styrene-butadiene rubber having a Mw of 5,000 to 70,000 grams/mole, polybutadiene rubber having a Mw of 5,000 to 70,000 grams/mole, or a combination thereof.

15. The tire of claim 1, wherein the at least one resin comprises phenolic resin.

16. The tire of claim 1, wherein the at least one resin comprises aliphatic resin.

17. The tire of claim 1, wherein the at least one resin comprises cycloaliphatic resin.

18. The tire of claim 1, wherein the at least one resin comprises aromatic resin.

19. The tire of claim 1, wherein the at least one resin comprises terpene resin.

20. The tire of claim 1, wherein the at least one resin comprises guayule resin.

* * * * *